US008824263B2

(12) United States Patent
Takaoka et al.

(10) Patent No.: US 8,824,263 B2
(45) Date of Patent: Sep. 2, 2014

(54) OPTICAL INFORMATION RECORDING DEVICE, OPTICAL INFORMATION RECORDING METHOD AND OPTICAL INFORMATION RECORDING MEDIUM

(75) Inventors: Tomoyasu Takaoka, Kyoto (JP); Atsushi Nakamura, Osaka (JP); Tetsuya Akiyama, Okayama (JP); Naoyasu Miyagawa, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/881,837

(22) PCT Filed: Mar. 13, 2012

(86) PCT No.: PCT/JP2012/001727
§ 371 (c)(1),
(2), (4) Date: Apr. 26, 2013

(87) PCT Pub. No.: WO2012/124313
PCT Pub. Date: Sep. 20, 2012

(65) Prior Publication Data
US 2013/0215731 A1  Aug. 22, 2013

(30) Foreign Application Priority Data
Mar. 16, 2011  (JP) .................................. 2011-058272

(51) Int. Cl.
*G11B 7/00* (2006.01)
*G11B 7/0045* (2006.01)
*G11B 7/1267* (2012.01)
*G11B 7/1263* (2012.01)

(52) U.S. Cl.
CPC .......... *G11B 7/00456* (2013.01); *G11B 7/1267* (2013.01); *G11B 7/1263* (2013.01)
USPC ............................................ 369/116; 369/94

(58) Field of Classification Search
CPC ................................................... G11B 7/24041
See application file for complete search history.

(56) References Cited

U.S. PATENT DOCUMENTS

2003/0012115 A1  1/2003  Akiyama et al.
2003/0081523 A1  5/2003  Miyagawa et al.
(Continued)

FOREIGN PATENT DOCUMENTS

JP  2679596  11/1997
JP  2004-5865  1/2004
(Continued)

OTHER PUBLICATIONS

International Search Report issued Apr. 17, 2012 in International (PCT) Application No. PCT/JP2012/001727.

*Primary Examiner* — Brenda Bernardi
(74) *Attorney, Agent, or Firm* — Wenderoth, Lind & Ponack, L.L.C.

(57) ABSTRACT

When the power of the write pulse is taken as the peak power and the power of the bottom pulse is taken as the bottom power, the power setting device (114) sets the power of each pulse in the recording pulse train such that the peak power PwN of the Nth information layer which is closest to the light entry surface of the optical recording medium (11), the bottom power PbN of the Nth information layer, the peak power PwM of the Mth information layer (where M is an integer such that N>M≥1), and the bottom power PbM of the Mth information layer satisfy the following formula:

$$PbN/PwN > PbM/PwM.$$

7 Claims, 20 Drawing Sheets

(56) References Cited

U.S. PATENT DOCUMENTS

| | | | |
|---|---|---|---|
| 2005/0089798 A1* | 4/2005 | Miura et al. | 430/270.11 |
| 2006/0013111 A1 | 1/2006 | Inoue et al. | |
| 2006/0292499 A1* | 12/2006 | Akiyama et al. | 430/321 |
| 2007/0280068 A1 | 12/2007 | Umezawa et al. | |
| 2008/0151726 A1 | 6/2008 | Yamakawa et al. | |
| 2010/0302921 A1 | 12/2010 | Takaoka et al. | |
| 2011/0085434 A1 | 4/2011 | Umezawa et al. | |
| 2011/0206889 A1* | 8/2011 | Mitsumori et al. | 428/64.4 |
| 2012/0243396 A1 | 9/2012 | Umezawa et al. | |
| 2012/0243398 A1 | 9/2012 | Umezawa et al. | |
| 2012/0243399 A1 | 9/2012 | Umezawa et al. | |

FOREIGN PATENT DOCUMENTS

| | | |
|---|---|---|
| JP | 2004-171642 | 6/2004 |
| JP | 2006-31936 | 2/2006 |
| JP | 2006-313621 | 11/2006 |
| JP | 2007-80463 | 3/2007 |
| JP | 2008-159231 | 7/2008 |
| JP | 4560009 | 10/2010 |
| WO | 2010/061557 | 6/2010 |

* cited by examiner

FIG.8

| dTtop | MARK LENGTH | | | | |
|---|---|---|---|---|---|
| | 2T | | 3T | 4T,6T,8T | 5T,7T,9T |
| | POSTERIOR SPACE LENGTH | | | | |
| | 2T | ≧3T | | | |
| ANTERIOR SPACE LENGTH 2T | | | | | |
| 3T | | | | | |
| 4T | | | | | |
| ≧5T | | | | | |

| Ttop | MARK LENGTH | | | | |
|---|---|---|---|---|---|
| | 2T | | 3T | 4T,6T,8T | 5T,7T,9T |
| | POSTERIOR SPACE LENGTH | | | | |
| | 2T | ≧3T | | | |
| ANTERIOR SPACE LENGTH 2T | | | | | |
| 3T | | | | | |
| 4T | | | | | |
| ≧5T | | | | | |

| dTlp | MARK LENGTH | |
|---|---|---|
| | 4T,6T,8T | 5T,7T,9T |
| POSTERIOR SPACE LENGTH 2T | | |
| 3T | | |
| 4T | | |
| ≧5T | | |

| Tlp | MARK LENGTH | |
|---|---|---|
| | 4T,6T,8T | 5T,7T,9T |
| POSTERIOR SPACE LENGTH 2T | | |
| 3T | | |
| 4T | | |
| ≧5T | | |

| dTe | MARK LENGTH | | | | |
|---|---|---|---|---|---|
| | 2T | | 3T | 4T,6T,8T | 5T,7T,9T |
| | ANTERIOR SPACE LENGTH | | | | |
| | 2T | ≧3T | | | |
| POSTERIOR SPACE LENGTH 2T | | | | | |
| 3T | | | | | |
| 4T | | | | | |
| ≧5T | | | | | |

| Tmp | MARK LENGTH |
|---|---|
| | ≧6T |
| NO POSTERIOR SPACE | |

|    | SET POWER(mW) | RATIO TO Pw |
|----|---------------|-------------|
| Pw |               |             |
| Pe |               |             |
| Pb |               |             |
| Pc |               |             |

FIRST INFORMATION LAYER  Unit: Tw/32

FIG.14 dTtop

| dTtop | | MARK LENGTH | | | | |
|---|---|---|---|---|---|---|
| | | 2T | | 3T | 4T,6T,8T | 5T,7T,9T |
| | | POSTERIOR SPACE LENGTH | | | | |
| | | 2T | ≧3T | | | |
| ANTERIOR SPACE LENGTH | 2T | 4 | 5 | −12 | −8 | −12 |
| | 3T | −1 | 2 | −13 | −9 | −13 |
| | 4T | −1 | 2 | −13 | −9 | −13 |
| | ≧5T | −1 | 2 | −13 | −9 | −13 |

| Ttop | | MARK LENGTH | | | | |
|---|---|---|---|---|---|---|
| | | 2T | | 3T | 4T,6T,8T | 5T,7T,9T |
| | | POSTERIOR SPACE LENGTH | | | | |
| | | 2T | ≧3T | | | |
| ANTERIOR SPACE LENGTH | 2T | 35 | 33 | 36 | 21 | 24 |
| | 3T | 33 | 31 | 35 | 21 | 24 |
| | 4T | 33 | 31 | 35 | 21 | 24 |
| | ≧5T | 33 | 31 | 35 | 21 | 24 |

| dTlp | | MARK LENGTH | |
|---|---|---|---|
| | | 4T,6T,8T | 5T,7T,9T |
| POSTERIOR SPACE LENGTH | 2T | −1 | −25 |
| | 3T | 2 | −23 |
| | 4T | 2 | −23 |
| | ≧5T | 2 | −23 |

| Tlp | | MARK LENGTH | |
|---|---|---|---|
| | | 4T,6T,8T | 5T,7T,9T |
| POSTERIOR SPACE LENGTH | 2T | 25 | 31 |
| | 3T | 24 | 30 |
| | 4T | 24 | 30 |
| | ≧5T | 24 | 30 |

| dTe | | MARK LENGTH | | | | |
|---|---|---|---|---|---|---|
| | | 2T | | 3T | 4T,6T,8T | 5T,7T,9T |
| | | ANTERIOR SPACE LENGTH | | | | |
| | | 2T | ≧3T | | | |
| POSTERIOR SPACE LENGTH | 2T | 1 | −2 | 4 | −6 | −4 |
| | 3T | 4 | 3 | 6 | −2 | −1 |
| | 4T | 4 | 3 | 6 | −2 | −1 |
| | ≧5T | 4 | 3 | 6 | −2 | −1 |

| Tmp | MARK LENGTH |
|---|---|
| | ≧6T |
| NO POSTERIOR SPACE | 24 |

FIG.15

SECOND INFORMATION LAYER  Unit: Tw/32 dTtop

| dTtop | | MARK LENGTH | | | | |
|---|---|---|---|---|---|---|
| | | 2T | | 3T | 4T,6T,8T | 5T,7T,9T |
| | | POSTERIOR SPACE LENGTH | | | | |
| | | 2T | ≧3T | | | |
| ANTERIOR SPACE LENGTH | 2T | 1 | 3 | -13 | -6 | -9 |
| | 3T | -1 | 0 | -14 | -7 | -10 |
| | 4T | -1 | 0 | -14 | -7 | -10 |
| | ≧5T | -1 | 0 | -14 | -7 | -10 |

Ttop

| Ttop | | MARK LENGTH | | | | |
|---|---|---|---|---|---|---|
| | | 2T | | 3T | 4T,6T,8T | 5T,7T,9T |
| | | POSTERIOR SPACE LENGTH | | | | |
| | | 2T | ≧3T | | | |
| ANTERIOR SPACE LENGTH | 2T | 13 | 13 | 16 | 13 | 13 |
| | 3T | 13 | 13 | 16 | 13 | 13 |
| | 4T | 13 | 13 | 16 | 13 | 13 |
| | ≧5T | 13 | 13 | 16 | 13 | 13 | dTlp

| dTlp | | MARK LENGTH | |
|---|---|---|---|
| | | 4T,6T,8T | 5T,7T,9T |
| POSTERIOR SPACE LENGTH | 2T | 3 | -25 |
| | 3T | 3 | -25 |
| | 4T | 3 | -25 |
| | ≧5T | 3 | -25 |

Tlp

| Tlp | | MARK LENGTH | |
|---|---|---|---|
| | | 4T,6T,8T | 5T,7T,9T |
| POSTERIOR SPACE LENGTH | 2T | 15 | 18 |
| | 3T | 14 | 17 |
| | 4T | 14 | 17 |
| | ≧5T | 14 | 17 | dTe

| dTe | | MARK LENGTH | | | | |
|---|---|---|---|---|---|---|
| | | 2T | | 3T | 4T,6T,8T | 5T,7T,9T |
| | | ANTERIOR SPACE LENGTH | | | | |
| | | 2T | ≧3T | | | |
| POSTERIOR SPACE LENGTH | 2T | 8 | 8 | 16 | 8 | 11 |
| | 3T | 11 | 9 | 17 | 9 | 12 |
| | 4T | 11 | 9 | 17 | 9 | 12 |
| | ≧5T | 11 | 9 | 17 | 9 | 12 |

Tmp

| Tmp | MARK LENGTH |
|---|---|
| | ≧6T |
| NO POSTERIOR SPACE | 13 |

THIRD INFORMATION LAYER  Unit:Tw/32

FIG.16

| dTtop | MARK LENGTH | | | | |
|---|---|---|---|---|---|
| | 2T | | 3T | 4T,6T,8T | 5T,7T,9T |
| | POSTERIOR SPACE LENGTH | | | | |
| | 2T | ≧3T | | | |
| ANTERIOR SPACE LENGTH  2T | -7 | -5 | -21 | -5 | -12 |
| 3T | -11 | -7 | -22 | -6 | -13 |
| 4T | -11 | -7 | -22 | -6 | -13 |
| ≧5T | -11 | -7 | -22 | -6 | -13 |

| Ttop | MARK LENGTH | | | | |
|---|---|---|---|---|---|
| | 2T | | 3T | 4T,6T,8T | 5T,7T,9T |
| | POSTERIOR SPACE LENGTH | | | | |
| | 2T | ≧3T | | | |
| ANTERIOR SPACE LENGTH  2T | 12 | 12 | 15 | 12 | 12 |
| 3T | 12 | 12 | 15 | 12 | 12 |
| 4T | 12 | 12 | 15 | 12 | 12 |
| ≧5T | 12 | 12 | 15 | 12 | 12 |

| dTlp | MARK LENGTH | |
|---|---|---|
| | 4T,6T,8T | 5T,7T,9T |
| POSTERIOR SPACE LENGTH  2T | 4 | -22 |
| 3T | 5 | -21 |
| 4T | 5 | -21 |
| ≧5T | 5 | -21 |

| Tlp | MARK LENGTH | |
|---|---|---|
| | 4T,6T,8T | 5T,7T,9T |
| POSTERIOR SPACE LENGTH  2T | 15 | 18 |
| 3T | 14 | 17 |
| 4T | 14 | 17 |
| ≧5T | 14 | 17 |

| dTe | MARK LENGTH | | | | |
|---|---|---|---|---|---|
| | 2T | | 3T | 4T,6T,8T | 5T,7T,9T |
| | ANTERIOR SPACE LENGTH | | | | |
| | 2T | ≧3T | | | |
| POSTERIOR SPACE LENGTH  2T | 1 | -2 | 12 | 8 | 11 |
| 3T | 5 | 3 | 13 | 9 | 12 |
| 4T | 5 | 3 | 13 | 9 | 12 |
| ≧5T | 5 | 3 | 13 | 9 | 12 |

| Tmp | MARK LENGTH |
|---|---|
| | ≧6T |
| NO POSTERIOR SPACE | 15 |

OPTICAL INFORMATION RECORDING DEVICE, OPTICAL INFORMATION RECORDING METHOD AND OPTICAL INFORMATION RECORDING MEDIUM

TECHNICAL FIELD

The present invention relates to an optical information recording device and an optical information recording method with which information is recorded on an optical information recording medium by means of laser beam irradiation, and to an optical information recording medium having two or more information layers.

BACKGROUND ART

When a recording film constituted by a thin film of a phase-change recording material or the like formed on a substrate is irradiated with a laser beam and subjected to localized heating, the recording film can be made to change to states with different optical constants due to differences in the irradiation conditions. Thus, the optical information recording medium (hereinafter also written as the optical recording medium) is subjected to the optical recording, erasure, rewriting, or reproduction of information by using a laser beam. Optical recording media have been widely researched and developed, and BDs (Blu-ray discs) and DVDs and CDs and the like have been commercialized.

With phase-change optical recording media, information is recorded as a result of a phase-change material, which constitutes a recording film, being made to undergo a change in state between a crystalline phase and a noncrystalline phase, for example, with the heat generated from laser beam irradiation. Further, reproduction of information is performed by detecting a difference in reflectance between the crystalline phase and the noncrystalline phase.

Among optical recording media, a rewritable optical recording medium is capable of information erasure or rewriting as a result of using, as the recording film, a phase-change recording material in which an reversible phase change is generated. In the case of a rewritable optical recording medium, the initial state of the recording film is typically the crystalline phase. If information is recorded, a high-power laser beam is irradiated to melt the recording film and the laser irradiated portion is then shifted to the noncrystalline phase by means of rapid cooling. If, on the other hand, information is erased, a laser beam of a low power in comparison with the laser beam used during recording is irradiated to raise the temperature of the recording film, and the laser irradiated portion is subsequently shifted to the crystalline phase through gradual cooling. Further, by irradiating a laser beam which is power-modulated between a high power and a low power on a recording film, the recording of new information while erasing recorded information, that is, rewriting, can be performed. In the case of a rewritable optical recording medium, the noncrystalline portions are marks and the crystalline portions are spaces.

Further, in the case of a recordable optical recording medium for which a material which generates an reversible phase change is used as the recording film, rewriting of information is not possible and information can be recorded only once.

For both a rewritable optical recording medium and also a recordable optical recording medium, a metal film of high thermal conductivity is typically used in addition to a recording film with the object of performing efficient cooling of the heat during recording.

The reproduction of information recorded on an optical recording medium is performed by checking a difference in reflectance between the crystalline layer and the noncrystalline layer. More specifically, the reproduction of information is performed by performing detection by taking the strength of reflected light from the optical recording medium as a signal when a laser beam, set with a certain fixed reproduction power, is irradiated on the optical recording medium.

As technologies for increasing the capacity of an optical recording medium, various technologies have been investigated. For example, there exists a method for reducing the minimum size of the mark length and space length to raise the recording density. This method is confronted not only by the problem that the S/N ratio of the reproduction signal drops, but is also subject to a phenomenon whereby heat, which is generated when marks are recorded, is diffused by the space parts and the process of cooling fore-and-aft adjacent marks is affected, that is, thermal interference is generated. When thermal interference is generated, the edge positions of the marks shift and the error rate during reproduction rises, which is problematic.

Therefore, a method has been disclosed according to which, if marks and spaces are formed by driving the laser power at two values, namely, a high power and a low power, recording is performed by changing the positions of the leading end parts of the marks according to the mark length of the recorded marks and the space length of the spaces directly in front of the marks, and changing the positions of the trailing end parts of the marks according to the mark length of the recorded marks and the space length of the spaces directly behind the marks (see Patent Literature 1, for example). Thus, by modulating the control parameters of the recording pulse which is selected when marks are recorded, variations in the edge positions of the marks caused by thermal interference between the marks during high density recording are compensated for.

Further, even if marks and spaces of the correct lengths are formed, due to the frequency characteristics of the reproduction optical system which are determined by the size of the optical beam spot, there is the problem that the edge positions of the short marks and spaces detected during reproduction are reproduced with discrepancy from the ideal values. This disparity between the detected edge and the ideal value is generally referred to as intercode interference. When the marks and spaces are made small in comparison with the optical beam spot, the intercode interference is substantial, and there is a problem in that jitter during reproduction increases and the error rate rises. Hence, a method has been proposed to determine the most probable signal series from a reproduction signal waveform obtained from the optical recording medium by means of a signal processing system called PRML (Partial Response Maximum Likelihood) which is one example of a maximum-likelihood decoding method.

For example, in an optical system which uses a laser beam with a wavelength of 405 nm and an objective lens with an NA (numerical aperture) of 0.85, it is preferable to adopt a PR (1, 2, 2, 1) ML system in order to record information at a capacity of 25 GB per side of a BD with a diameter of 12 cm and to accurately reproduce recorded information. Furthermore, in order to record information at a capacity of 33.4 GB per side using the same optical system, it is necessary to shorten the mark length and increase the line density. In this case, a PR (1, 2, 2, 1) ML system is desirably adopted for the processing of the reproduction signal.

Furthermore, Patent Literature 2 discloses a recording control method with which there is no reproduction signal jitter and which uses a PRML system to optimize the control parameters of the recording pulse when recording information. With the recording control method of Patent Literature 2, the signal waveform is estimated from the reproduction signal waveform by means of the PRML system and the control parameters of the recording pulse are optimized to minimize the error reproduction probability.

As another measure for increasing the capacity of an optical recording medium, there exists a method which records or reproduces information on a plurality of information layers by means of a laser beam which enters from one side of a rewritable optical recording medium which comprises a plurality of information layers.

For example, if an optical recording medium comprises two information layers, the recording capacity doubles. In an optical recording medium which records or reproduces information on two information layers by means of a laser beam which enters from one side of the optical recording medium, the recording or reproduction of information on the information layer farthest from the entry side (hereinafter the first information layer) is performed by means of a laser beam which passes through the information layer closest to the entry side (hereinafter the second information layer). That is, when the transmittance of the second information layer is low, because the energy of the laser beam which reaches the first information layer is attenuated, the reflectance from the first information layer is substantially small and the signal quality of the information during reproduction suffers. Note that in the following description, reflectance refers to a substantial reflectance which includes attenuation caused by passage through another information layers. Further, reflectance which does not include attenuation caused by passage through another information layer is called film reflectance.

When the transmittance of the second information layer is low, there is an increased amount of laser power required to suitably record information on the first information layer. If the laser power exceeds the limits of the recording device, suitable recording cannot be achieved and the quality of the information is adversely affected at the time of recording. Hence, the second information layer preferably possesses a transmittance which is as high as possible.

In order for the information layer on the entry side of the laser beam to have a high transmittance, in the information layer on the entry side of the laser beam, the extinction coefficient is preferably large and the thickness of the metal film is preferably small. However, in a recordable optical recording medium, when the metal film is low in thickness, the rate of cooling of the heat generated during recording is slow. For this reason, the transmission of heat to outside the areas where the laser beam is irradiated is large and the reproduction signal worsens as a result of blurring of the boundaries between the marks and spaces. Therefore, usage of a recording pulse to achieve a rapid cooling temperature change from the time information is recorded on the information layer farthest from the entry side when information is recorded on the information layer closest to the laser beam entry side has been proposed (Patent Literature 3).

Patent Literature 4 discloses recording information, relating to control parameters of a recording pulse for suitable recording of an optical recording medium, in information units within a predetermined area of the optical recording medium.

In addition, Patent Literature 5 discloses, in an optical recording medium comprising a plurality of information layers, calculating, for each information layer, parameters of each power of a recording pulse which is modulated with a plurality of powers with different levels, and recording information relating to the ratio between a specific power of each information layer and the highest level power in information units within a predetermined area of the optical recording medium.

However, with the technology of Patent Literature 3, if information is recorded on an optical recording medium comprising three or more information layers in order to further increase the capacity, there is a problem in that the erasure performance suffers. In other words, in order to further increase the transmittance, a recording film made from a phase-change material with a high extinction coefficient must have a small thickness like a metal film. However, generally, in a rewritable optical recording medium, when a recording film made from a phase-change material has a small thickness, the crystallization rate is low. A phase change from the noncrystalline phase to the crystalline phase is hard to produce and the information erasure performance is compromised.

In the second information layer of an optical recording medium comprising two information layers, the effect of the erasure performance being compromised is not problematic. However, in order to realize an optical recording medium which comprises three information layers, the transmittance of the information layer closest to the laser beam entry side (hereinafter the third information layer) must be higher than the transmittance of the second information layer. Therefore, the thickness of the recording film of the third information layer is thinner than the thickness of the recording film of the second information layer and it is hard for the erasure performance of the third information layer to satisfy the level that is actually required.

In addition, in an optical recording medium which comprises three information layers, the reproduction of a signal which is recorded on the second information layer is performed by means of a laser beam whose light quantity is attenuated by passing through the third information layer. Hence, the substantial reflectance of the second information layer is reduced. Typically, the ratio between the reflectances of two different information layers is preferably between 0.5 and 2.0. To this end, the film reflectance of the second information layer must be higher than the film reflectance of the third information layer. However, in an information layer for which light transmittance is required, when the film reflectance increases, there tends to be a reduction in the ratio between the reflectance of the recording film which is the crystalline phase and the reflectance of the recording film which is the noncrystalline phase. Hence, the signal amplitude is reduced and there is a problem in that the reproduction signal quality of the second information layer suffers.

CITATION LIST

Patent Literature

Patent Literature 1: Japanese Patent Publication No. 2679596
Patent Literature 2: Japanese Patent Application Publication No. 2008-159231
Patent Literature 3: Japanese Patent Application Publication No. 2006-31936
Patent Literature 4: Japanese Patent Application Publication No. 2006-313621
Patent Literature 5: Japanese Patent Publication No. 4560009

SUMMARY OF THE INVENTION

The present invention is to solve the foregoing problems and an object thereof is to provide an optical information recording device, an optical information recording method and an optical information recording medium which are capable of recording high quality information on all information layers of an optical recording medium having two or more information layers.

The optical information recording device according to one aspect of the present invention is an optical information recording device which records information on an optical information recording medium including N (where N is an integer of two or more) information layers, the N information layers each having a recording film of which a physical state changes as a result of a localized temperature change brought about by focusing a laser beam, and which includes: a light source which emits the laser beam; a recording pulse train generation unit which generates a recording pulse train for forming a recording mark on the recording film; a power setting unit which sets a power of each pulse in the recording pulse train; and a driving unit which drives the light source to emit the laser beam corresponding to the recording pulse train generated by the recording pulse train generation unit with the power set by the power setting unit, wherein the recording pulse train includes at least one write pulse having a highest power, a bottom pulse which is formed, when there is a plurality of write pulses, between the write pulses, and a cooling pulse which is formed subsequent to a last write pulse, and when a power of the write pulse is taken as a peak power and a power of the bottom pulse is taken as a bottom power, the power setting unit sets the power of each pulse in the recording pulse train such that a peak power $PwN$ of an Nth information layer which is closest to a light entry surface of the optical information recording medium, a bottom power $PbN$ of the Nth information layer, a peak power $PwM$ of an Mth information layer (where M is an integer such that $N > M \geq 1$), and a bottom power $PbM$ of the Mth information layer satisfy the following formula:

$$PbN/PwN > PbM/PwM.$$

According to the present invention, the power of each pulse in the recording pulse train is set such that the ratio of the bottom power $PbN$ to the peak power $PwN$ of the Nth information layer closest to the light entry surface of the optical information recording medium in the Nth information layer is greater than the ratio of the bottom power $PbM$ to the peak power $PwM$ of the Mth information layer (where M is an integer $N > M \geq 1$), and hence the temperature change during recording of the Mth information layer is relatively rapid cooling and the recording marks which are noncrystalline phases can be easily formed. Therefore, even in the Mth information layer, for which the ratio between the reflectance of the recording film which is a crystalline phase and the reflectance of the recording film which is noncrystalline tends to be small as a result of setting the reflectance high, the signal amplitude can be increased and the reproduction signal quality can be improved.

Further, because the temperature change during recording of the Nth information layer is relatively slow cooling and the recording marks which are noncrystalline phases are formed smaller, rewriting of information is straightforward. Hence, even in the Nth information layer for which the thickness of the recording film is small in order to increase the transmittance and the erasure performance readily suffers, the erasure performance which is actually required can be ensured.

Thus, in the case of an optical recording medium which includes two or more information layers, high quality information can be recorded on all information layers.

The object, features and advantages of the present invention will become more apparent from the following detailed explanation and attached drawings.

BRIEF DESCRIPTION OF THE DRAWINGS

FIG. 8 is a drawing showing an example of a recording compensation table for setting each parameter of an N/2 recording strategy according to the embodiment of the present invention.

FIG. 14 is a drawing showing an example of a recording compensation table of a first information layer of the optical recording medium according to the embodiment of the present invention.

FIG. 15 is a drawing showing an example of a recording compensation table of a second information layer of the optical recording medium according to the embodiment of the present invention.

FIG. 16 is a drawing showing an example of a pre-learning recording compensation table of a third layer of the optical recording medium according to the embodiment of the present invention.

DESCRIPTION OF EMBODIMENTS

Figure 1:
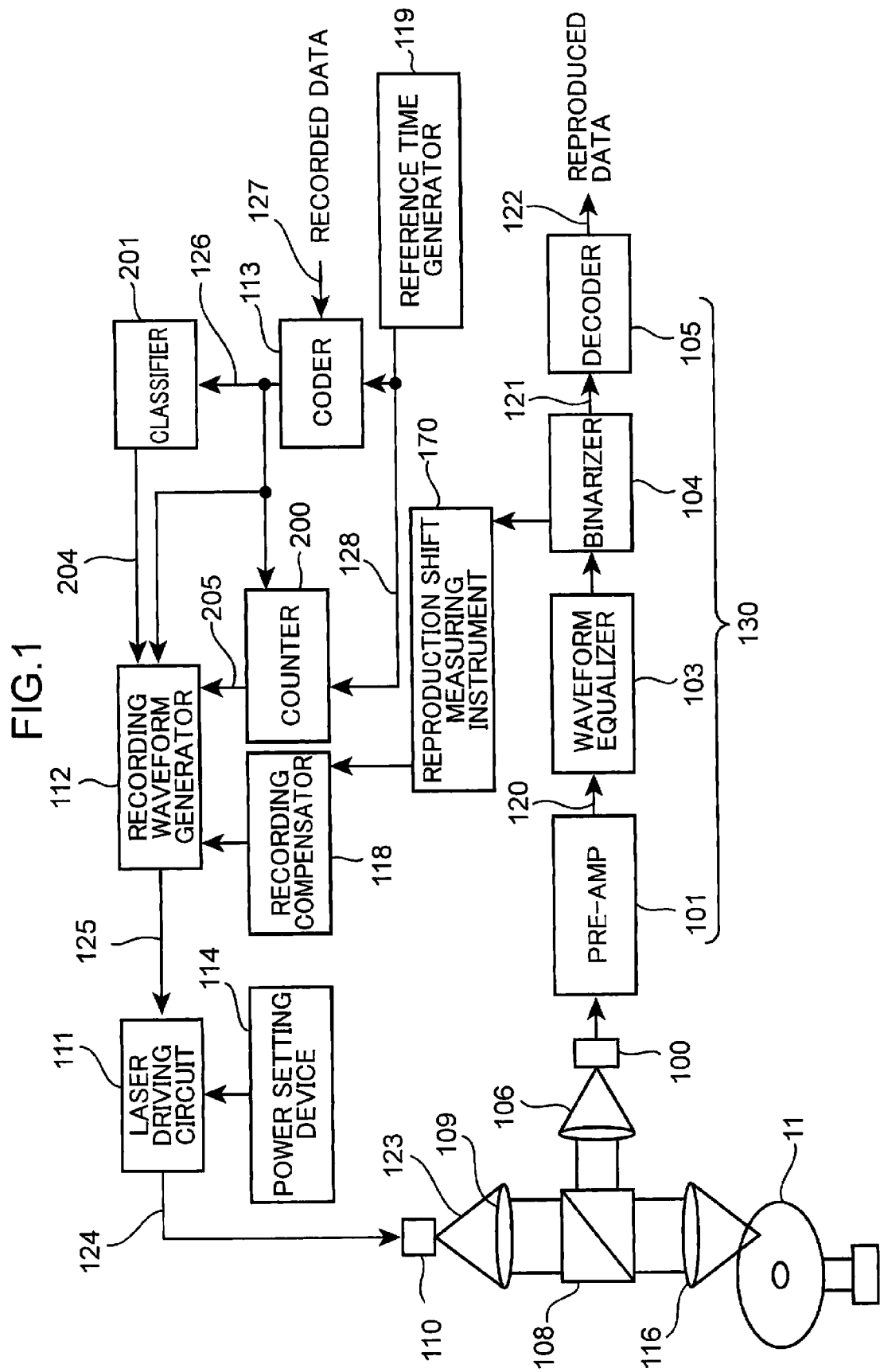
FIG. 1 is a block diagram showing the configuration of an optical recording/reproduction device according to an embodiment of the present invention.

Embodiments of the present invention will be described hereinbelow with reference to the drawings. Note that the following embodiments are examples and the present invention is not limited to the embodiments below. Further, in the following embodiments, the same reference numerals are sometimes assigned to the same parts to avoid repetition in the description.

FIG. 1 is a block diagram showing the configuration of the optical recording/reproduction device according to the embodiments of the present invention. The optical recording/reproduction device shown in FIG. 1 comprises, as a recording system, a coder 113, a reference time generator 119, a counter 200, a classifier 201, a recording waveform generator 112, a recording compensator 118, a laser driving circuit 111, a power setting device 114, a laser beam source 110, and a recording optical system comprising an objective lens 116 and the like.

Furthermore, the optical recording/reproduction device shown in FIG. 1 comprises, as a reproduction system, a reproduction optical system which comprises a detection lens 106 and the like, an light detector 100, a pre-amp 101, a waveform equalizer 103, a binarizer 104, a decoder 105, and a reproduction shift measuring instrument 170. Note that the foregoing recording optical system comprises an objective lens 116, a collimating lens 109, and a half mirror 108, and the reproduction optical system comprises the detection lens 106, the objective lens 116, and the half mirror 108.

The optical recording reproduction device records information on the optical recording medium 11. The optical recording medium 11 comprises N (where N is an integer of two or more) information layers. The N information layers each comprise a recording film which generates variations in the physical state by means of a localized temperature change brought about by focusing a laser beam. Note that the optical recording medium 11 according to this embodiment comprises only information layers of three layers.

First, each component of the optical recording/reproduction device shown in FIG. 1 will be described. The coder 113 converts the recorded recording data 127 to a recording code string (NRZI (Non Return to Zero Inversion) series) 126 which represents the mark length and space length of the marks and spaces formed on the optical recording medium 11, and start position information for the marks and spaces. The recording code string 126 is transmitted to the classifier 201, the recording waveform generator 112, and the counter 200.

The classifier 201 classifies each mark of the recording code string 126 according to a predetermined rule on the basis of the mark length (code length) of the mark, the space length of the space immediately preceding the mark, and the space length of the space immediately after the mark. The classifier 201 outputs a classification result to the recording waveform generator 112 as a classification signal 204.

The counter 200 references the recording code string 126, measures the time from the start position of a mark by taking the reference time signal 128 generated by the reference time generator 119 as a unit and generates a count signal 205. Note that the coder 113 and the recording waveform generator 112 each operate in synchronization with the reference time signal 128. The reference time signal 128 is generated from a signal that is synchronized by performing a PLL (Phase Locked Loop) on a signal read from the wobble on the optical recording medium 11.

The recording compensator 118 reads information which is already recorded in a specific area of the optical recording medium 11, and holds recording compensation table data which is the pulse position movement amount of each recording pulse waveform generated by the recording waveform generator 112 which corresponds to each mark length of each mark, the space length immediately preceding each mark, and the space length immediately after each mark. The recording compensator 118 transmits the recording compensation table data to the recording waveform generator 112.

The recording waveform generator 112 compensates, on a time axis, a waveform of a pulse shape according to a recording code string (NRZI series) 126, the classification signal 204, and recording compensation table data. As a result, the recording code string 126 is converted to a recording pulse signal 125 which corresponds to the recording waveform. The recording pulse signal 125 is set at levels of three stages according to the laser power level.

The recording waveform generator 112 selects control parameters of the recording pulse train for forming marks by means of a combination of the mark length of the marks, a first space length of a first space immediately preceding the marks, and a second space length of a second space immediately after the marks.

The control parameters are at least one of the pulse edge position at the leading edge of the recording pulse train, the second pulse edge position from the leading edge of the recording pulse train, the pulse edge position at the end of the recording pulse train, and the second pulse edge position from the end of the recording pulse train.

The recording compensator 118 stores a recording compensation table relating to edge variation amounts dTS1, dTS2, dTE1, and dTE2 for changing the positions of the pulse edge of the recording pulse signal 125, as described subsequently. The recording compensator 118 transmits the recording compensation table to the recording waveform generator 112 and the recording waveform generator 112 classifies the pulses of each mark length according to the classification signal 204, and transmits a recording pulse signal 125 for which the position and width of each recording pulse are compensated to the laser driving circuit 111. The recording waveform generator 112 generates a recording pulse train for forming recording marks on the recording film.

The power setting device 114 sets the power of each pulse of the recording pulse train. The recording pulse train comprises at least one write pulse possessing the highest power, a bottom pulse which is formed between a plurality of write pulses if there exists a plurality of write pulses, and a cooling pulse which is formed subsequent to the last write pulse. When the power of the write pulse is taken as the peak power, the power of the bottom pulse is taken as the bottom power, and the power of the cooling pulse is taken as the cooling power, the power setting device 114 sets the power of each pulse in the recording pulse train.

Note that the recording waveform generator 112 generates an erasure pulse between two consecutive recording pulse trains. The power of the erasure pulse is taken as the erase power. The power setting device 114 sets the power of each pulse of the recording pulse train and the erasure pulse.

The laser driving circuit 111 drives the laser beam source 110 such that a laser beam which corresponds to the recording pulse train generated by the recording waveform generator 112 is emitted at the power set by the power setting device 114.

The laser driving circuit 111 sets the laser power corresponding to each of three levels (peak power Pw, erase power Pe, and bottom power Pb) of the recording pulse signal 125 at the power level set by the power setting device 114, and drives the laser beam source 110 by means of a laser driving current 124. The laser beam source 110 forms recording marks by irradiating pulse-shaped light on the optical recording medium 11. The laser driving circuit 111 records marks by means of a recording pulse train according to selected control parameters.

The reading unit 130 is set from a pre-amp 101, a waveform equalizer 103, a binarizer 104, and a decoder 105. The reading unit 130 reads power information which comprises the peak power of each information layer and the bottom power of each information layer from the optical recording medium 11. The optical recording medium 11 records the peak power which represents the power of the write pulse of each information layer and the bottom power which represents the power of the bottom pulse of each information layer.

Note that, according to this embodiment, the optical recording/reproduction device corresponds to an example of an optical information recording device, the laser beam source 110 corresponds to an example of a light source, the recording waveform generator 112 corresponds to an example of a recording pulse train generation unit, the power setting device 114 corresponds to an example of a power setting unit, the laser driving circuit 111 corresponds to an example of a driving unit, and the reading unit 130 corresponds to an example of a reading unit.

A method of recording information on the optical recording medium 11 in the recording system of the optical recording/reproduction device will be described next.

The recording pulse signal 125 is transmitted to the laser driving circuit 111. The laser driving circuit 111 references the recording pulse signal 125 and the power set by the power setting device 114 to generate the laser driving current 124 according to the level of the recording pulse signal 125, and causes the laser beam source 110 to emit light according to a predetermined recording waveform of the recording pulse signal 125. The laser beam 123 emitted from the laser beam source 110 passes through the collimating lens 109, the half mirror 108, and the objective lens 116 and condenses on the optical recording medium 11 so as to heat the recording film and form the marks and spaces.

The method of reproducing information from the optical recording medium 11 in the reproduction system of the optical recording/reproduction device will be described next.

When information is reproduced, the laser beam source 110 emits a laser beam 123 of a power level low enough not to damage the recorded marks and scans the string of marks on the optical recording medium 11. The light reflected from the optical recording medium 11 passes through the objective lens 116 and the half mirror 108 and enters the detection lens 106. The laser beam passes through the detection lens 106 and is condensed on the light detector 100. The condensed light is converted into an electrical signal according to the strength or weakness of the light intensity distribution in the light detector 100. The electrical signal is amplified and attenuated by the pre-amp 101 provided in each light detector 100 and is a reproduction signal 120 which corresponds to the existence or non-existence of marks in the scanning position on the optical recording medium 11. The reproduction signal 120 is subjected to waveform equalization processing by the waveform equalizer 103. The reproduction signal 120 which has undergone waveform equalization processing is converted in the binarizer 104 into the binary data "0" or "1", synchronized by the PLL, and converted into a binary reproduction signal 121. In addition, the decoder 105 subjects the binary reproduction signal 121 to conversion which is the opposite of the conversion in the coder 113 to generate reproduction data 122.

Here, for example, the frequency of the reference time signal 128 is 132 MHz, and the Tw (channel clock cycle) is approximately 7.5 nsec. The optical recording medium 11 is rotated at a fixed linear speed of 7.38 msec. The laser beam source 110 is configured from a semiconductor laser beam source and emits a laser beam with a wavelength of 405 nm. The NA of the objective lens 116 is 0.85. The optical recording medium 11 is a multilayered disc comprising a plurality of information layers and may be a two-layer disc, a three-layer disc, or a four-layer disc. Furthermore, the optical recording medium 11 may, in addition to a rewritable optical disc medium using phase-change recording material, be a recordable optical disc medium which can be recorded only once. The encoding system is (1-7) modulation. The shortest code length in (1-7) modulation is 2Tw.

Figure 2:
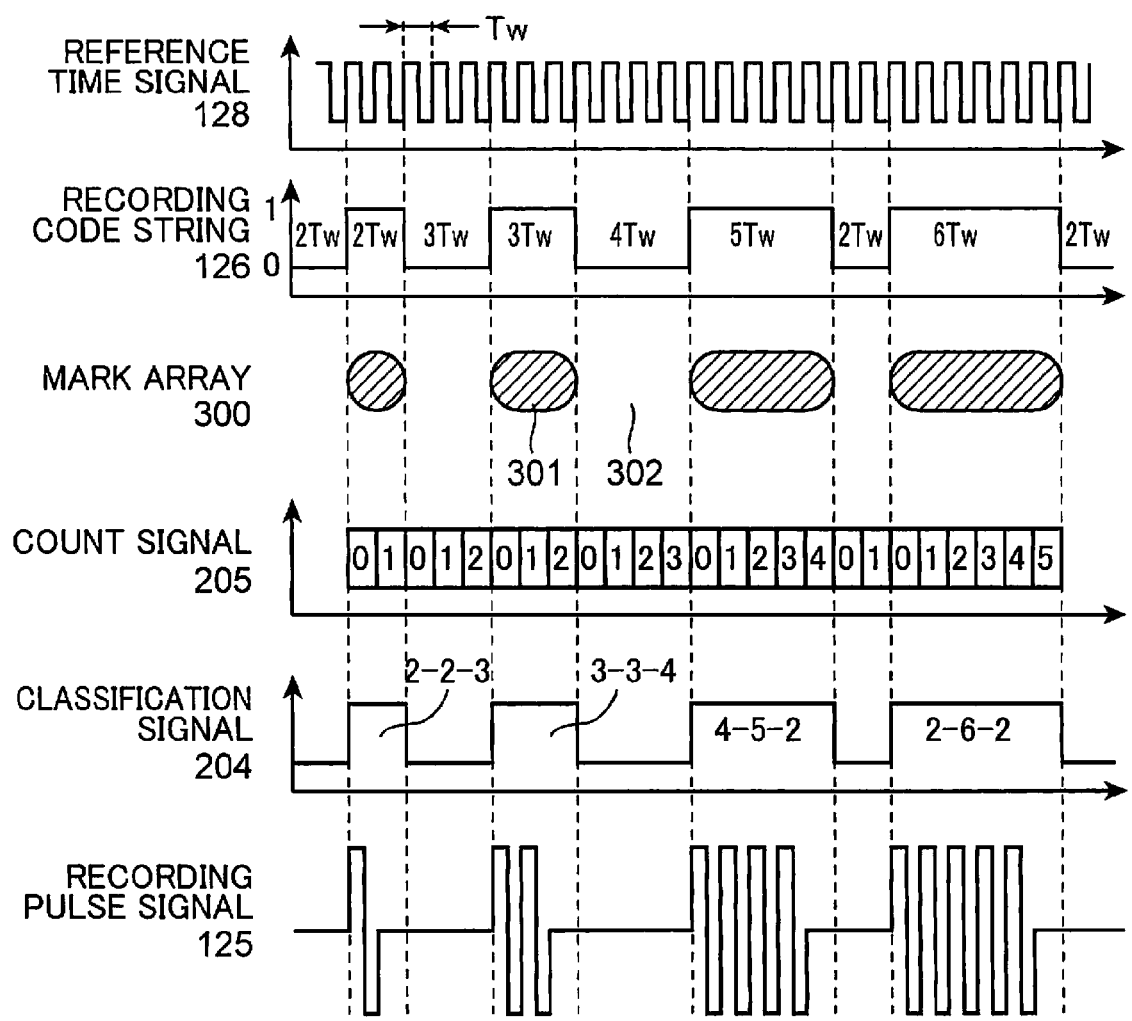
FIG. 2 is a drawing serving to illustrate marks and spaces in a recording code array of an optical recording/reproduction device according to the embodiment of the present invention, and an example of a recording waveform generation operation which records marks and spaces.

FIG. 2 is a drawing serving to illustrate marks and spaces in a recording code array of an optical recording/reproduction device according to the embodiment of the present invention, and an example of a recording waveform generation operation which records marks and spaces.

The reference time signal 128 of FIG. 2 is a signal which represents a time reference for the recording operation and is the Tw cycle. The recording code string 126 in FIG. 2 represents the result of performing NRZI conversion on the recording data 127 by means of the coder 113. Here, Tw is the detection window width and is the smallest unit of the variation amount of the mark length and space length in the recording code string 126. The mark array 300 in FIG. 2 shows an image of marks 301 and spaces 302 which are actually recorded on the optical recording medium 11. The spot of the laser beam is scanned in a left to right direction on the plane of paper of FIG. 2. The marks 301 correspond on a one-to-one basis with level "1" in the recording code string 126 and are formed in lengths which are proportional to the periods. The count signal 205 in FIG. 2 measures the time starting from the start of the marks 301 and the spaces 302 in Tw units. Therefore, the length of the marks and the spaces in Tw units is typically called the run length.

The classification signal 204 in FIG. 2 represents the classification signal in the optical recording/reproduction device according to this embodiment and, in this example, classification is performed by means of a combination of three values, namely, the value of the mark length of each mark, the space length of the space directly preceding each mark, and the space length of the space directly after each mark. For example, "4-5-2" in the classification signal 204 in FIG. 2 represents the fact that, for a mark with a mark length of 5Tw, the space length of the space directly preceding the mark is 4Tw and the space length of the space directly following the mark is 2Tw. Note that, according to this embodiment, these space lengths may be referred to as 4T and 2T respectively with the "w" in 4Tw and 2Tw omitted. Further, for the space length, "s" may be appended as the run length suffix, i.e. 4Ts, and where the mark length is concerned, "m" may be appended at the end of the run length, i.e. 2Tm.

The recording pulse signal 125 of FIG. 2 is the recording pulse signal which corresponds to the recording code string 126 of FIG. 2 and is an example of a light waveform which is actually recorded. The recording pulse signal 125 is generated with reference to recording compensation table data which is emitted from the count signal 205, the recording code string 126, the classification signal 204, and the recording compensator 118.

The recording compensation method of the optical recording/reproduction device according to this embodiment will be described next.

Figure 3:
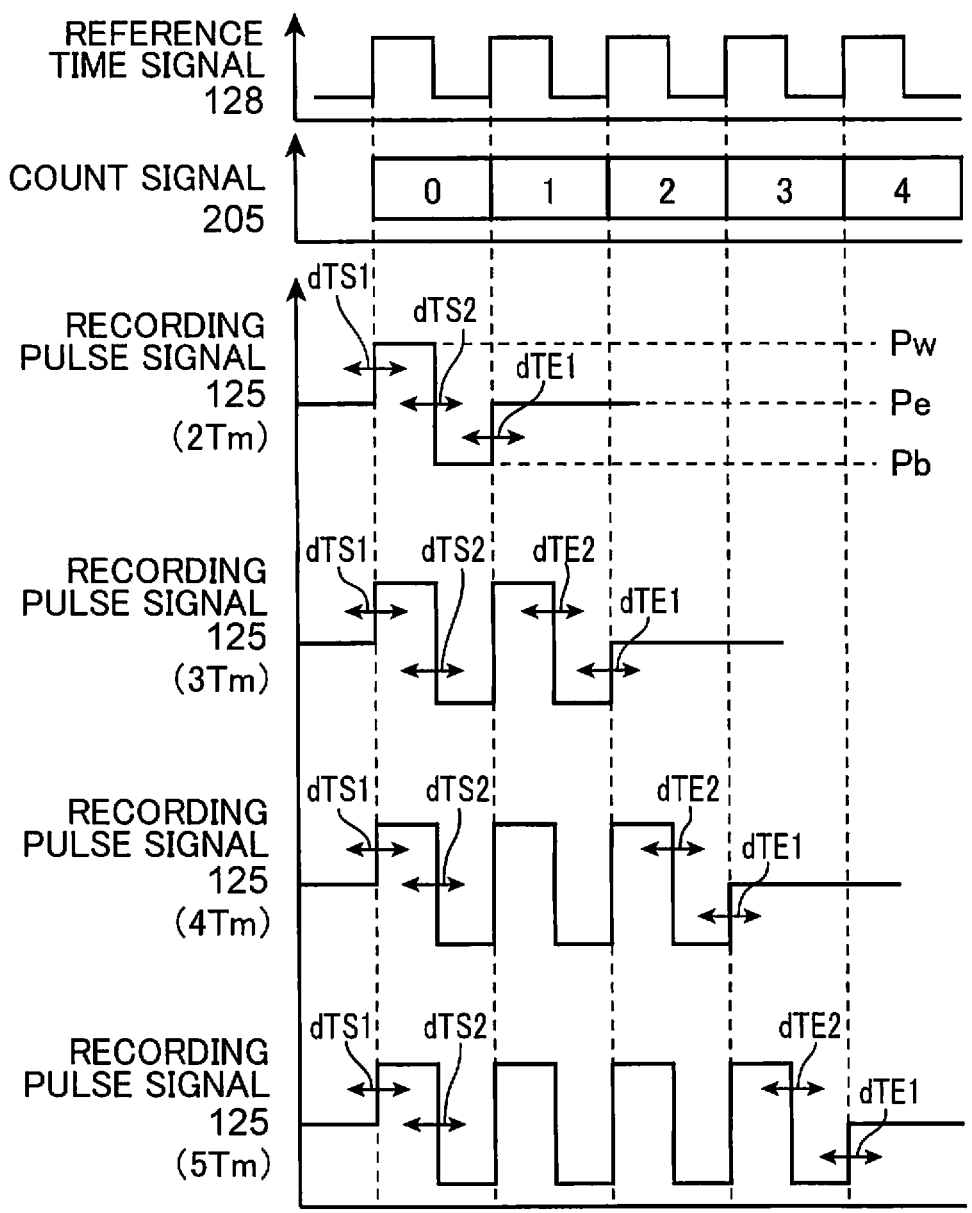
FIG. 3 is a schematic diagram showing the relationship between mark length of the marks and the recording waveform of a recording pulse signal.

FIG. 3 is a schematic diagram showing the relationship between the mark length of marks and the recording waveform of the recording pulse signal 125. The reference time signal 128 of FIG. 3 is a signal which is a time reference for the recording operation, and is a Tw cycle. The count signal 205 in FIG. 3 is a signal which is generated by the counter 200 and which measures the time from the start of a mark in reference time Tw units of the reference time signal 128. The timing with which the count signal 205 shifts to 0 corresponds to the start of the mark or space. The recording pulse signal 125 in FIG. 3 is a recording pulse signal for when a recording mark is formed. FIG. 3 respectively shows a recording pulse signal 125 of a mark 2Tw (Tm), a recording pulse signal 125 of a mark 3Tw (Tm), a recording pulse signal 125 of a mark 4Tw (Tm), and a recording pulse signal 125 of a mark 5Tw (Tm). The recording pulse signals 125 are level-modulated and are modulated with three values, namely, the peak power (Pw) which is the highest level, an erase power (Pe) of an intermediate level, and a bottom power (Pb) which is the lowest level. Further, after the final pulse, a cooling pulse is formed with the bottom power.

However, although the power levels are modulated with three power levels here, by setting mutually different levels for the bottom power of the cooling pulse after the final pulse and for the bottom power between intermediate pulses, power modulation with a total of four levels is possible. At this time, the power of the cooling pulse is called cooling power (Pc). Further, although the bottom power has been afforded a lower power level than erase power in FIG. 3, the bottom power may be a power level between the erase power and peak power levels. Furthermore, although there is one intermediate pulse in the recording pulse signal of mark 4Tw in FIG. 3, when the mark length (code length) grows longer by 1Tw at a time, i.e. 5Tw and 6Tw, the number of intermediate pulses increases by one according to the increased length.

In the recording compensation (adaptive compensation) according to this embodiment, classification is performed for each mark by means of the mark length of the marks, the space length of the space immediately preceding the marks, and the space length of the spaces immediately following the marks. Further, the position of the pulse edge of the recording pulse train recording each of the marks is varied only by edge variation amounts dTS1, dTS2, dTE1, and dTE2 according to the classification result. Because the recording pulse signal 125 is controlled in this way, the leading edge positions or the trailing edge positions of the marks formed on the optical recording medium 11 can be precisely controlled. In addition, because the pulse edges are controlled, not only according to the mark length of the recorded marks but also according to the space length of the space immediately preceding the marks and the space length of the space immediately following the marks, the leading edge position or trailing edge position of the marks can be more precisely controlled by considering the intercode interference.

Figure 4:
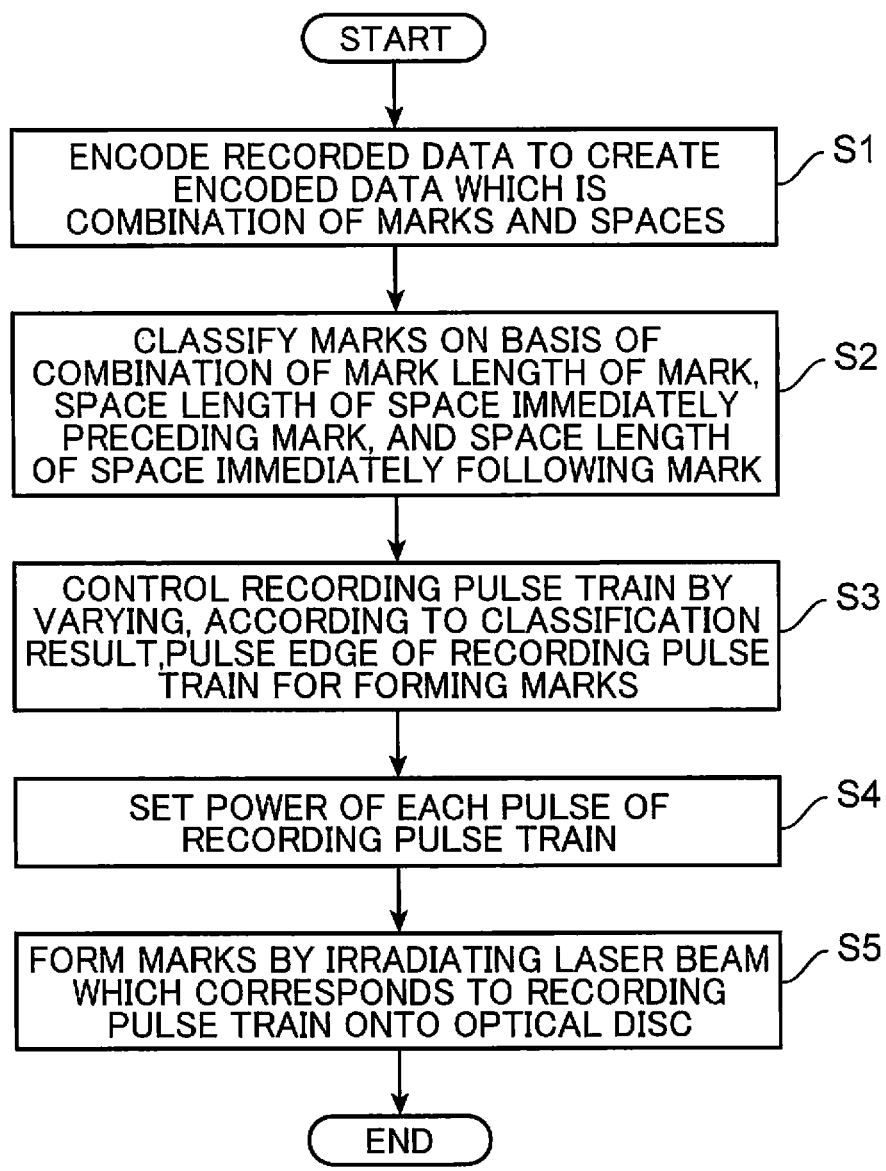
FIG. 4 is a flowchart serving to illustrate an optical information recording method of the optical recording/reproduction device according to the embodiment of the present invention.

The recording compensation method of the optical recording method according to this embodiment will now be described using the flowchart of FIG. 4. FIG. 4 is a flowchart serving to illustrate an optical information recording method of an optical recording/reproduction device according to this embodiment of the present invention.

First, the coder 113 encodes recording data to create encoded data which is a combination of marks and spaces (step S1). This encoded data corresponds to the recording code string 126 in FIG. 2.

The classifier 201 subsequently performs classification of the marks on the basis of a combination of the mark length of the marks, the space length of the space immediately preceding the marks, and the space length of the space immediately following the marks (step S2). In the classification signal 204 in FIG. 2, the 2T mark is classified as "2-2-3", the 3T mark is classified as "3-3-4", the 5T mark is classified as "4-5-2", and the 6T mark is classified as "2-6-2." The classification signals 204 are each combined in the order "anterior space length", "mark length", and "posterior space length." Note that "anterior space length" denotes the space length of the space immediately preceding the mark and "posterior space length" denotes the space length immediately following the mark.

The recording waveform generator 112 controls the recording pulse train by varying the position of the pulse edge of the recording pulse train for forming the marks according to the classification results (step S3). The recording waveform generator 112 selects the control parameters of the recording pulse train for forming the marks by means of a combination of the mark length of the marks, the first space length of the first space preceding the marks, and the second space length of the second space following the marks.

For example, in the recording pulse signal 125 of 4Tm mark in FIG. 3, the recording waveform generator 112 varies the position of the leading pulse edge by an edge variation amount dTS1, varies the position of the second pulse edge from the leading edge by an edge variation amount dTS2, varies the position of the trailing pulse edge by an edge variation amount dTE1, and varies the position of the second pulse edge from the trailing edge by an edge variation amount dTE2.

The power setting device 114 subsequently sets the power of each pulse in the recording pulse train (step S4).

The laser driving circuit 111 then generates a laser driving current 124 according to the power set by the power setting device 114 and a recording pulse signal 125 generated by the recording waveform generator 112, and outputs the generated laser driving current 124 to the laser beam source 110. The laser beam source 110 forms marks by irradiating a laser beam corresponding to the recording pulse train on the optical recording medium 11 (step S5).

Figure 5:
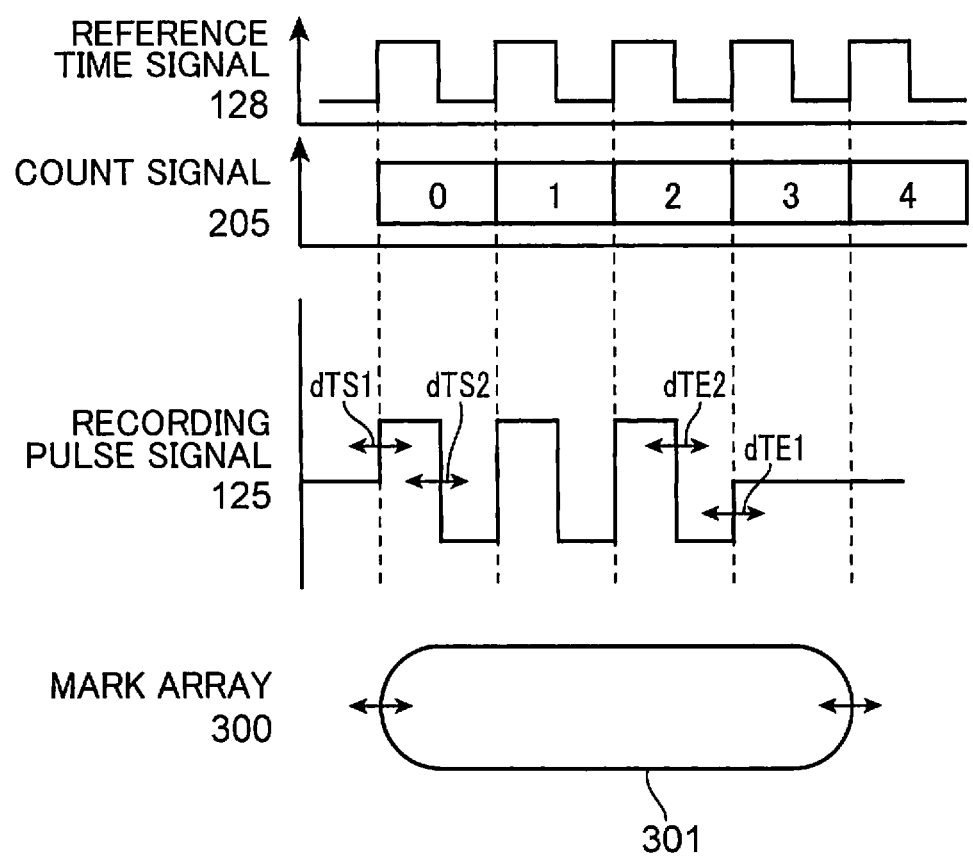
FIG. 5 is a drawing showing an example of control of a recording pulse train of the optical information recording method according to the embodiment of the present invention.

FIG. 5 is a drawing showing an example of control of a recording pulse train of the optical information recording method according to the embodiment of the present invention. FIG. 5 shows a case where, if marks 301 of mark length 4T are recorded, the position of the pulse edge of the recording pulse train is changed by edge variation amounts dTS1, dTS2, dTE1, and dTE2. The reference time signal 128 in FIG. 5 is a signal which is a time reference for the recording operation and the count signal 205 in FIG. 5 is a signal which is generated by the counter 200. The recording pulse signal (recording pulse train) 125 in FIG. 5 varies the position of the pulse edge by edge variation amounts dTS1, dTS2, dTE1 and dTE2. The mark array 300 in FIG. 5 shows an image of a mark 301 of mark length 4T which is recorded by the recording pulse signal (recording pulse train) 125 in FIG. 5. FIG. 5 shows that the leading edge position of the mark 301 can be precisely controlled.

The edge variation amount dTS1 of the leading edge is defined, as shown in Table 1 below, on the basis of the result of classification by way of the mark length of the recorded marks, the space length of the space immediately preceding the mark (anterior space length), and the space length of the space immediately following the mark (posterior space length). Table 1 is a table showing an example of a recording compensation table relating to the edge variation amount dTS1 of the leading edge.

TABLE 1

|  |  | Mark length | | | | |
|---|---|---|---|---|---|---|
|  |  | 2T | | | | |
|  |  | Posterior space length | | | | |
|  | dTS1 | 2T | ≥3T | 3T | 4T | ≥5T |
| Anterior | 2T | a0 | a4 | b0 | c0 | d0 |
| space | 3T | a1 | a5 | b1 | c1 | d1 |
| length | 4T | a2 | a6 | b2 | c2 | d2 |
|  | ≥5T | a3 | a7 | b3 | c3 | d3 |

The edge variation amount dTS1 of the leading edge divides the mark lengths of the recorded marks into four lengths, namely, 2T, 3T, 4T, and 5T and, only when the mark length is 2T, the posterior space length is divided into two lengths, namely, 2T and 3T, and the anterior space length is divided into four, namely, 2T, 3T, 4T, and 5T, whereby (4+1)×4+20 classifications are defined respectively.

The edge variation amount dTS1 is the position of the leading pulse edge and hence the effect of the anterior space (the space immediately preceding the mark) prevails, but when the mark length is 2T, the effect of the posterior space (the space immediately following the mark) is also considerable, and therefore classification is performed accordingly.

Note that, here, for the edge variation amount dTS1, although classification is performed such that there are four mark lengths, four anterior space lengths, and two posterior space lengths, the present invention is not limited to such a case. For example, classification may be such that there are two, three, five, or six or more mark lengths, and classification may be performed such that there are two, three, four, five, six or more anterior space lengths and posterior space lengths respectively. The edge variation amount dTS1 may be defined by an absolute time such as a1=2 nsec, for example, or may be defined by an integer multiple value of Tw/32 on the basis of the reference time signal 128.

That is, in the process of selecting the control parameters of the recording pulse train, when the shortest mark length is taken as k, the mark lengths are classified into at least four types, namely k, k+1, k+2, and k+3 or more. Note that the mark length may be classified into at least two types, namely, k and k+1 or more, and the mark length may be classified into at least three types, namely, k, k+1, and k+2 or more. Note that, according to this embodiment, if the shortest mark length is 2T, the mark length k+1 signifies a mark length of 3T, the mark length k+2 signifies a mark length 4T, and the mark length k+3 signifies a mark length 5T.

In addition, in the process of selecting the control parameters for the recording pulse train, when the shortest mark length is taken as k, the first space length (anterior space length) and the second space length (posterior space length) are each classified into at least two types, namely, k and k+1.

Note that the first space length and the second space length are respectively classified into at least four types, namely, k, k+1, k+2, and k+3 or more.

The recording waveform generator 112 refers to a recording compensation table which associates control parameters with combinations of the mark length, the first space length, and the second space length.

The second edge variation amount dTS2 from the leading edge is also similar to the edge variation amount dTS1 and, as shown in Table 2 below, is defined on the basis of the result of classification using the mark length of the recorded marks, the space length of the space immediately preceding the mark (anterior space length), and the space length of the space immediately following the mark (posterior space length). Table 2 is a table showing an example of a recording compensation table relating to the second edge variation amount dTS2 from the leading edge.

TABLE 2

|  |  | Mark length | | | | |
|---|---|---|---|---|---|---|
|  |  | 2T | | | | |
|  |  | Posterior space length | | | | |
|  | dTS2 | 2T | ≥3T | 3T | 4T | ≥5T |
| Anterior | 2T | e0 | e4 | f0 | g0 | h0 |
| space | 3T | e1 | e5 | f1 | g1 | h1 |
| length | 4T | e2 | e6 | f2 | g2 | h2 |
|  | ≥5T | e3 | e7 | f3 | g3 | h3 |

The edge variation amount dTE1 of the trailing edge is, as shown in Table 3 below, defined on the basis of the result of classification using the mark length of a recorded mark, the space length of the space immediately preceding the mark (the anterior space length), and the space length of the space immediately following the mark (posterior space length). Table 3 is a table showing an example of the recording compensation table relating to the edge variation amount dTE1 of the trailing edge.

TABLE 3

|  |  | Mark length | | | | |
|---|---|---|---|---|---|---|
|  |  | 2T | | | | |
|  |  | Anterior space length | | | | |
|  | dTE1 | 2T | ≥3T | 3T | 4T | ≥5T |
| Posterior | 2T | i0 | i4 | j0 | k0 | m0 |
| space | 3T | i1 | i5 | j1 | k1 | m1 |
| length | 4T | i2 | i6 | j2 | k2 | m2 |
|  | ≥5T | i3 | i7 | j3 | k3 | m3 |

The edge variation amount dTE1 of the trailing edge divides the mark lengths of the recorded marks into four lengths, namely, 2T, 3T, 4T, and 5T or more and, only when the mark length is 2T, the anterior space length is divided into two lengths, namely, 2T and 3T or more, and the posterior space length is divided into four, namely, 2T, 3T, 4T, and 5T or more, whereby (4+1)×4=20 classifications are defined respectively.

The edge variation amount dTE1 is the position of the leading pulse edge and hence the effect of the posterior space prevails, but when the mark length is 2T, the effect of the anterior space is also considerable, and therefore classification is performed accordingly.

Note that, here, for the edge variation amount dTE1, although classification is performed such that there are four mark lengths, four posterior space lengths, and two anterior space lengths, the present invention is not limited to such a case. For example, classification may be such that there are two, three, five, or six or more mark lengths, and classification may be performed such that there are two, three, four, five, six or more anterior space lengths and posterior space lengths respectively. The edge variation amount dTE1 may be defined by an absolute time such as i1=2 nsec, for example, or may be defined by an integer multiple value of Tw/32 on the basis of the reference time signal 128.

The second edge variation amount dTE2 from the trailing edge is, as shown in Table 4 below, defined on the basis of the result of classification using the mark length of a recorded mark, the space length of the space immediately preceding the mark (the anterior space length), and the space length of the space immediately following the mark (posterior space length). Table 4 is a table showing an example of the recording compensation table relating to the second edge variation amount dTE2 from the trailing edge.

TABLE 4

| dTE2 | | Mark length | | |
|---|---|---|---|---|
| | | 3T | 4T | ≥5T |
| Posterior space length | 2T | p0 | q0 | r0 |
| | 3T | p1 | q1 | r1 |
| | 4T | p2 | q2 | r2 |
| | ≥5T | p3 | q3 | r3 |

The second edge variation amount dTE2 from the trailing edge divides the mark lengths of the recorded marks into three lengths, namely, 3T, 4T, and 51 or more and the posterior space length is divided into four, namely, 2T, 3T, 4T, and 5T or more, whereby 3×4=12 classifications are defined respectively.

The edge variation amount dTE2 is the position of the second pulse edge from the trailing edge. The edge variation amount dTE2 of mark 2T coincides with the second edge variation amount dTS2 from the leading edge, and hence is not defined.

Note that, here, for the edge variation amount dTE2, although classification is performed such that there are three mark lengths and four posterior space lengths, the present invention is not limited to such a case. For example, there may be two, four, or five or more mark lengths, and there may be two, three, five, six or more posterior space lengths. The edge variation amount dTE2 may be defined by an absolute time such as p1=2 nsec, for example, or may be defined by an integer multiple value of Tw/32 on the basis of the reference time signal 128.

As mentioned earlier, the leading edge position of the mark 301 can be more precisely controlled by varying the position of the pulse edge of the leading edge of the recording pulse signal 125 by the edge variation amounts dTS1, dTS2, dTE1, and dTE2. In addition, because not only the mark lengths of the recorded marks but also the pulse edge is controlled according to the anterior space length, the leading edge position of the mark 301 can be more precisely controlled by considering intercode interference.

Note that, in the foregoing example, although the positions of the second pulse edge from the leading edge and the second pulse edge from the trailing edge are changed, the positions of the third or subsequent pulse edge from the leading edge and the third or subsequent pulse edge from the trailing edge may be changed.

Furthermore, for each of the edge variation amounts dTS1, dTS2, dTE1, and dTE2, classification of the anterior space length and the posterior space length may be simplified into two lengths, namely, 2T and 3T or more as per Tables 5 to 8 below. Table 5 is a table showing an example of a recording compensation table relating to the edge variation amount dTS1 of the leading edge, Table 6 is a table showing an example of a recording compensation table relating to a second edge variation amount dTS2 from the leading edge, Table 7 is a table showing an example of a recording compensation table relating to an edge variation amount dTE1 of the trailing edge, and Table 8 is a table showing an example of a recording compensation table relating to a second edge variation amount dTE2 from the trailing edge.

TABLE 5

| | | Mark length | | |
|---|---|---|---|---|
| | | 2T | | |
| | | Posterior space length | | |
| dTS1 | | 2T | ≥3T | ≥3T |
| Anterior space length | 2T | A0 | A2 | B0 |
| | ≥3T | A1 | A3 | B1 |

TABLE 6

| | | Mark length | | |
|---|---|---|---|---|
| | | 2T | | |
| | | Posterior space length | | |
| dTS2 | | 2T | ≥3T | ≥3T |
| Anterior space length | 2T | E0 | E2 | F0 |
| | ≥3T | E1 | E3 | F1 |

TABLE 7

| | | Mark length | | |
|---|---|---|---|---|
| | | 2T | | |
| | | Anterior space length | | |
| dTE1 | | 2T | ≥3T | ≥3T |
| Posterior space length | 2T | I0 | I2 | J0 |
| | ≥3T | I1 | I4 | J1 |

TABLE 8

| | | Mark length |
|---|---|---|
| dTE2 | | ≥3T |
| Posterior space length | 2T | P0 |
| | ≥3T | P1 |

If high density recording is performed by focusing the laser beam on the optical recording medium 11, the minimum recording mark and space are about as small as the optical beam spot. Hence, a signal pertaining to the shortest mark and the shortest space can no longer be recorded or reproduced in the correct edge position due to intercode interference as a result of the optical MTF (Modulation Transfer Function) effect. Therefore, if an adequate recording characteristic taking intercode interference into account can be obtained simply through division into the shortest 2T space length and other space lengths, there is the advantage that the device can be simplified because simplification of the recording compensation table is possible through simple classification as described above.

In addition, recording compensation tables pertaining to each of the foregoing edge variation amounts dTS1, dTS2, dTE1, and dTE2 will be described.

The recording compensation tables held in the recording compensator 118 are obtained by way of either of the following two methods. With the first method, the recording compensator 118 reads the recording compensation table which has already been recorded at the time of disc fabrication or after disc fabrication in an area called a lead-in area of the optical recording medium 11, and stores the recording compensation table thus read. In the case of the second method, the recording compensator 118 actually performs a trial write using a predetermined recording pulse signal to a trial write area on the optical recording medium 11, reproduces the trial-written marks and spaces, measures the edge shift amount, and acquires a recording compensation table from the learning result in the process of searching for conditions affording the best signal quality.

With the first method, the recording compensation table recorded in a predetermined area of the optical recording medium 11 is obtained as reproduction data and is stored in the recording compensator 118.

Figure 6:
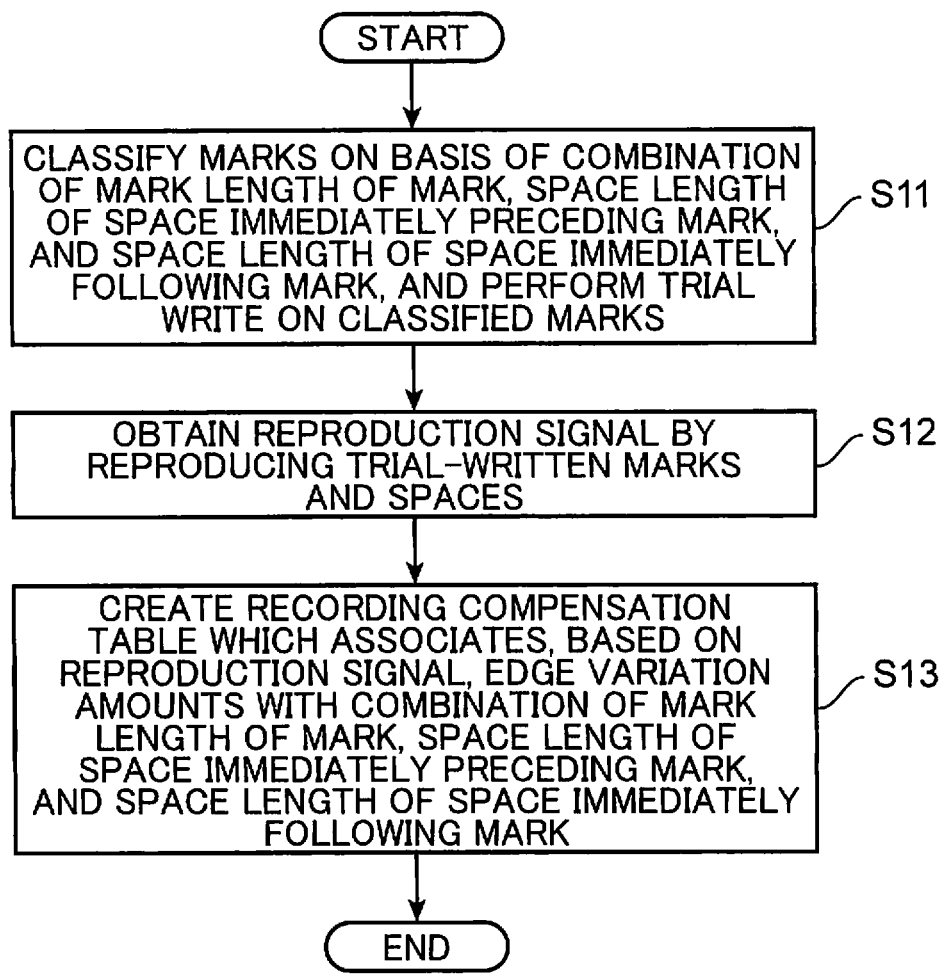
FIG. 6 is a flowchart serving to illustrate a method for creating a recording compensation table of the optical information recording method according to the embodiment of the present invention.

A second method will be described next using the flowchart in FIG. 6, in which method the recording compensation table is created by performing a trial write of a predetermined recording code string to the optical recording medium 11. FIG. 6 is a flowchart serving to illustrate a method in which the recording compensation table of the optical information recording method according to the embodiment of the present invention is created.

First, the optical recording/reproduction device classifies the marks on the basis of a combination of the mark length of the marks, the space length of the space immediately preceding the marks, and the space length of the space immediately following the marks, and trial-writes the classified marks to the trial-write area on the optical recording medium 11 (step S11). Thereupon, the optical recording/reproduction device trial-writes marks with the mark lengths 2T, 3T, 4T, and 5T respectively, and trial-writes, for each of the marks, anterior spaces with space lengths 2T, 3T, 4T, and 5T, and posterior spaces with space lengths 2T, 3T, 4T, and 5T.

The optical recording/reproduction device then obtains a reproduction signal by reproducing the trial-written marks and spaces (step S12).

The optical recording/reproduction device subsequently creates a recording compensation table which, based on the reproduction signal, associates edge variation amounts with a combination of the mark length of the marks, the space length of the space immediately preceding the marks, and the space length immediately following the marks (step S13). As a result, the optical recording/reproduction device creates the recording compensation tables shown in Tables 1 to 4 or the recording compensation tables shown in Tables 5 to 8. An electrical signal resulting from photoelectric conversion by the optical detector 100 is modulated by the pre-amp 101 to generate a reproduction signal 120 which passes through the waveform equalizer 103 and the binarizer 104 to produce a binary reproduction signal 121. The binary reproduction signal 121 thus obtained is sent not only to the decoder 105 but also to the reproduction shift measuring instrument 170. The reproduction shift measuring instrument 170 compares a PLL-synchronized binary reproduction signal with the binary reproduction signal prior to synchronization, measures the shift amount (edge variation amount) for each mark and space, and transmits the measurement result to the recording compensator 118.

Note that, if a trial-write in a trial-write area of the optical recording medium 11 is performed, the optical recording/reproduction device may update the recording compensation table where necessary in accordance with the measured edge variation amount, perform the foregoing recording operation once again, and repeat the recording operation in order to search for the recording compensation table to reduce the edge shift between the PLL clock and binary reproduction signal during playback.

Further, detection of the edge shift is difficult because the mark length and space length are small, and if the signal pattern is measured by means of the PRML system, the shift component of the MLSE (Maximum Likelihood Sequence Estimation) value from a normal edge shift amount may be measured.

Note that although an example of a case where the recording power is modulated with laser power levels of three values was described in the embodiment of the present invention, it goes without saying that the same result is also obtained even when modulation is performed using laser power levels of four values which also include a cooling pulse with a different power level from the bottom power in the intermediate pulse. That is, the recording pulse train is modulated by switching the intensity of the laser beam between power of three or more values.

The recording power is temporarily stored in the power setting device 114. The detection unit 130 reads power information which is already recorded at the time of disc fabrication or after disc fabrication to an area called the lead-in area of the optical recording medium 11, and temporarily stores the read power information in the power setting device 114. The power setting device 114 sets the power of each pulse in the recording pulse train on the basis of the values of the power information read by the reading unit 130. Note that the power information includes the peak power, the bottom power, the cooling power, and the erase power of each information layer. Further, the power information may be information denoted by the ratio of the peak power, bottom power, cooling power, and erase power of each information layer to the peak power (Pw).

Further, the power setting device 114 may instruct the laser driving circuit 111 to trial-write to the trial-write area of the optical recording medium 11 and re-set the peak power according to the learning result obtained in the process of searching for suitable conditions on the basis of a signal obtained by reproducing the trial-written signal. The power setting device 114 may re-set, for each information layer, the erase power, bottom power, and cooling power by using the ratio to the re-set peak power and pre-stored peak power.

Further, the recording pulse according to this embodiment may be such that, when the mark length recorded increases by one, the number of pulses increases by one, but be subject to different rules for the number of pulses. For example, the recording pulse may be such that when the recorded mark length increases by two, the number of pulses increases by one, or there may be no cooling pulse after the final pulse.

Figure 7:
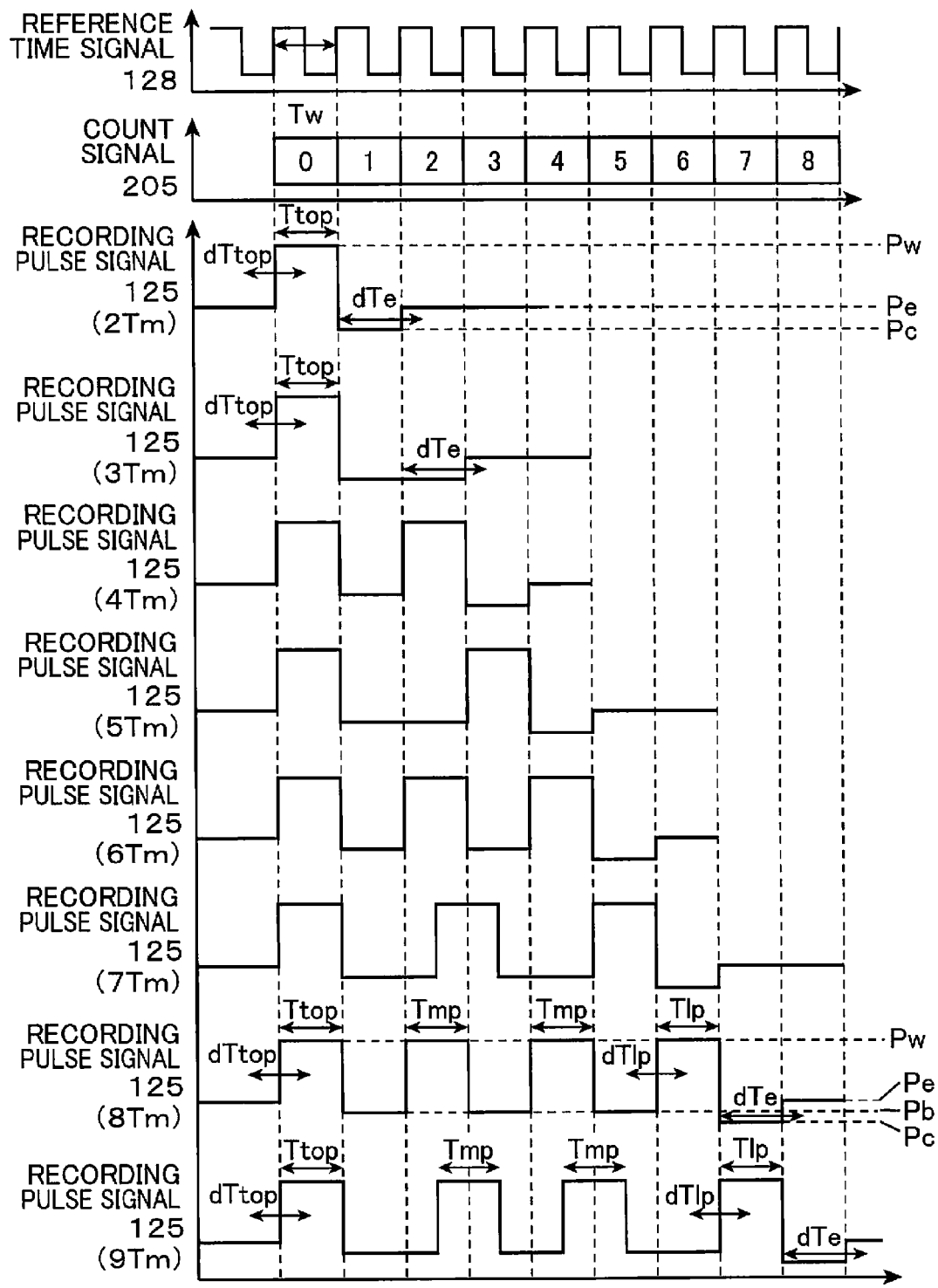
FIG. 7 is a drawing serving to illustrate an example of a recording pulse for which, when the mark length recorded increases by two, the number of pulses increases by one.

An example of a recording pulse which is such that the number of pulses increases by one when the recorded mark length increases by two will be described hereinbelow. FIG. 7 is a drawing serving to illustrate an example of a recording pulse for which, when the mark length recorded increases by two, the number of pulses increases by one, according to the embodiment of the present invention. Note that a case where the recording pulse is such that the number of pulses increases by one when the recorded mark length increases by two is called an N/2 recording strategy.

With the N/2 recording strategy, a recording waveform for recording the shortest mark (2T) and the second shortest mark (3T) comprises only one pulse (top pulse). Further, a recording waveform for recording the third shortest mark (4T) and the fourth shortest mark (5T) comprises two pulses (from the front, a top pulse and a last pulse). Furthermore, a recording waveform for recording the fifth shortest mark (6T) and the sixth shortest mark (7T) comprises three pulses (from the front, a top pulse, an intermediate pulse, and a last pulse). A waveform for recording the seventh shortest mark (8T) and a longer mark than the seventh shortest mark is such that the intermediate pulses increase by one every time the mark length increases by two.

Here, each parameter of the N/2 recording strategy may be classified and set according to the length of the recording mark as shown in FIG. 8. FIG. 8 is a drawing showing an example of a recording compensation table for setting each parameter of an N/2 recording strategy according to the embodiment of the present invention.

First, the top pulse rise position dTtop and the top pulse width Ttop may be set with four classifications for the length of the recording marks, namely, "2T", "3T", "4T, 6T, 8T", and "5T, 7T, 9T", for example.

Further, the rise position dT1$p$ and the last pulse width T1$p$ of the rise of the last pulse may be set with two classifications for the length of the recording marks, namely, "4T, 6T, 8T", and "5T, 7T, 9T", for example.

In addition, the position (open position of the erase power Pe) dTe in which the setting of the cooling power Pc ends may be set with four classifications for the length of the recording marks, namely, "2T", "3T", "4T, 6T, 8T", and "5T, 7T, 9T". Note that the recording pulse train may not comprise a cooling pulse as a result of the position dTe being set such that the fall of the last pulse coincides with the start position of the erase power Pe.

Further, for the rise position of the intermediate pulse, there may be two classifications for the length of the recording marks, namely, "6T, 8T" and "7T, 9T". In the case of the former classification, the rise of the intermediate pulse coincides with the reference clock position. With the latter classification, the rise of the intermediate pulse is shifted by T/2 from the reference clock. Further, the intermediate pulse width Tmp may be set the same for all the recording mark lengths "6T, 7T, 8T, 9T".

The parameters classified according to the length of the recording marks may be classified by the anterior/posterior space lengths of the recording marks.

For example, for the position dTtop and width Ttop, there may be four classifications for the length of the anterior space (the space immediately before the recording mark), namely, "2T", "3T", "4T", and "5T or more." In addition, for the position dTtop and the width Ttop, for mark 2T, there may be two classifications, namely, "2T" and "3T or more", for the length of the posterior space (the space immediately following the recording mark).

Furthermore, for the position dT1$p$ and the width T1$p$, there may be four classifications for the posterior space length, namely, "2T", "3T", "4T", and "5T or more."

Further, for the position dTe, there may be four classifications for the posterior space length, namely, "2T", "3T", "4T", and "5T or more." In addition, for the position dTe, there may be two classifications, namely, "2T" and "3T or more", for the length of the anterior space, of mark 2T.

Furthermore, the width Tmp may be set the same for all the lengths of the recording marks, namely, "6T, 7T, 8T, 9T".

The recording compensation table for setting each of the parameters of the N/2 recording strategy on the basis of the above classification is shown as in FIG. 8. Note that the specific values of each parameter are omitted from the recording compensation table shown in FIG. 8.

Figures 9, 10:
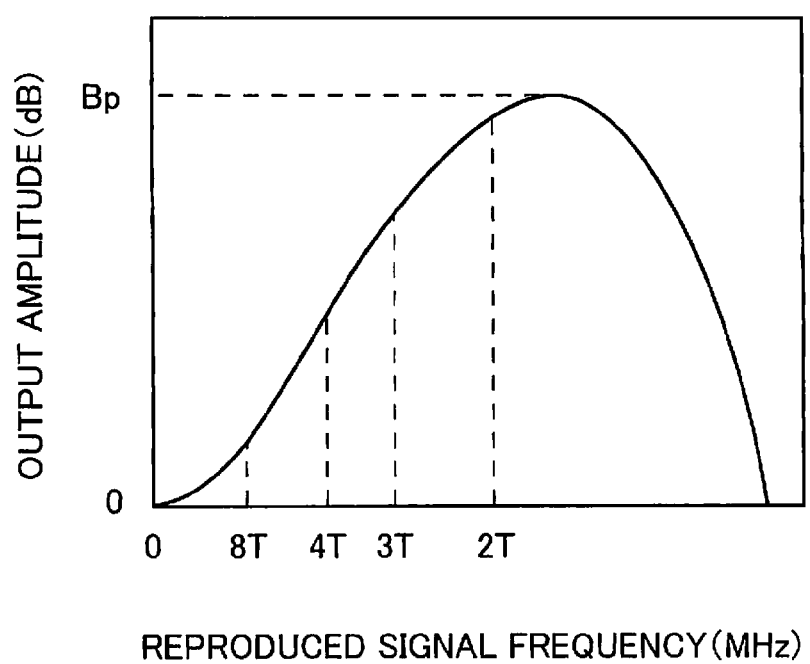
FIG. 9 is a drawing showing an example of power information according to the embodiment of the present invention.
FIG. 10 is a drawing which schematically shows a frequency characteristic of a waveform equalizer according to the embodiment of the present invention.

FIG. 9 is a drawing showing an example of power information according to the embodiment of the present invention. As shown in FIG. 9, the power information may be set using the values peak power Pw, erase power Pe, bottom power Pb, and cooling power Pc, or may be set using the ratio of the respective power levels to the peak power. Note that the specific values of each power are omitted from the power information shown in FIG. 9.

The optical information reproduction method of the optical recording/reproduction device according to the embodiment of the present invention will be described next. Typically, in order to suitably reproduce information, it is important that the reflectance of each information layer in the optical recording medium 11 be large, that there be a large ratio between the reflectance of the recording film which is a crystalline phase and the reflectance of the recording film which is a noncrystalline phase, and that there be a large laser power during reproduction. In addition, the optical information reproduction method described in this embodiment is characterized in that waveform crystallization with the frequency characteristic shown in FIG. 10 is performed.

With the optical information reproduction method according to this embodiment, marks recorded on the optical recording medium 11 are read using a laser beam and a reproduction signal 120 is generated by using a detection lens 106, an optical detector 100, and a pre-amp 101. The reproduction signal 120 is a signal whose frequency characteristic has been corrected by a waveform equalizer 103. In addition, the reproduction signal 120 with the corrected frequency characteristic is converted to a binary reproduction signal 121 by a binarizer 104. A decoder 105 performs inverse conversion on the binary reproduction signal 121 to generate reproduction data 122.

Among the 2Tw signal, 3Tw signal, 4Tw signal, 8Tw signal, and the like, the 2Tw signal and so on has a mark which grows smaller as the frequency of the signal rises, and hence an attenuation of the frequency-dependent optical output, i.e. the amplitude of the reproduced signal is small, is observed. Therefore, in order to correct such output attenuation, with the optical information reproduction method according to this embodiment, an equalizer characteristic is set so that the higher the frequency of the signal, the larger the output amplitude.

FIG. 10 is a drawing which schematically shows a frequency characteristic of a waveform equalizer 103 according to the embodiment of the present invention, and which represents the ratio of the amplitude of the output signal to the input signal. In FIG. 10, the horizontal axis represents the reproduction signal frequency and schematically shows the frequencies of the 2Tw signal, 3Tw signal, 4Tw signal, and 8Tw signal. The vertical axis represents a logarithmic display of the output amplitude of the waveform equalizer 103. As the waveform equalizer 103, it is possible to employ a combination of a highpass filter and a bandpass filter which has a peak at a slightly higher frequency than 2Tw, or a combination of a highpass filter, a bandpass filter, and an amplifier.

Therefore, the difference between the output amplitude in a case where the mark or space is a high frequency signal such as the 2Tw signal and the output amplitude in a case where the mark or space is a low frequency signal such as 8Tw, that is, the slope of the characteristics curve grows larger as the shortest mark length grows shorter. Accordingly, the difference between the output amplitude of the frequency of the 4Tw signal and the output amplitude of the frequency of the 8Tw signal also grows larger, for example.

Therefore, the reproduction signal characteristic is preferably a characteristic which prevents a peak shift in the reproduction frequency characteristic, which varies the noise frequency distribution, affords good reproduction signal quality, and improves the reproduction signal error rate.

Figure 11:
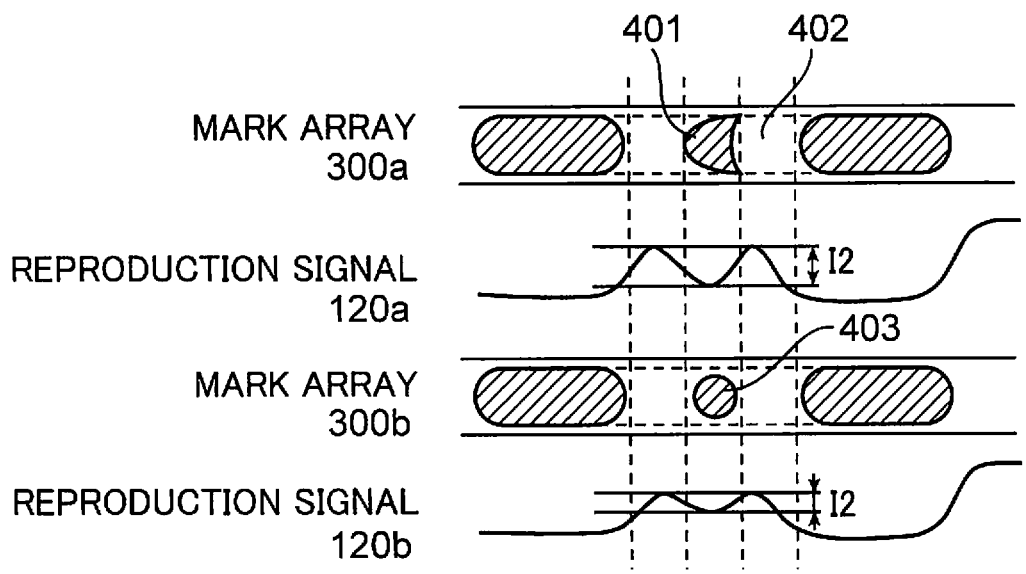
FIG. 11 is a schematic diagram showing a reproduction signal waveform according to the optical information reproduction method according to the embodiment of the present invention.

FIG. 11 is a schematic diagram showing a reproduction signal waveform according to the optical information reproduction method according to the embodiment of the present invention. FIG. 11 is a schematic diagram which shows a difference in the reproduction signal characteristics due to a difference in the mark shape. The mark arrays 300a and 300b in FIG. 11 represent mark shapes after the optical beam spot has scanned from left to right across the drawing and recording marks have been formed. The reproduction signals 120a, 120b in FIG. 11 represent reproduction signals after the respective mark shapes of the mark arrays 300a and 300b have been formed and after the marks have been read using light of an intensity that is insufficient to erase recorded marks.

The mark array 300a in FIG. 11 shows a representative mark shape of a rewritable disc which utilizes phase change technology. In the mark array 300a, the smallest 2Tw mark 401 is formed as a ginkgo-shaped mark. The mark shape of the 2Tw mark 401 comes to be ginkgo-shaped as a result of the mark trailing edge portion being subsequently recrystallized by the cooling pulse. A reproduction signal 120a in FIG. 11 is a reproduction signal for when the marks of the mark array 300a in FIG. 11 are reproduced. If the 2Tw mark 401 and the 2Tw space 402 are adjacent to one another as shown in FIG. 11, the reproduction signal amplitude is smallest. In this case, I2 is the smallest amplitude.

Meanwhile, the mark array 300b in FIG. 11 shows an example of a mark shape formed on a recordable disc which utilizes phase change technology. The reproduction signal 120b in FIG. 11 is a reproduction signal for when the marks of the mark array 300b in FIG. 11 are reproduced. Marks which have not undergone recrystallization using a cooling pulse are formed on the recordable disc. Hence, the 2Tw marks 403 are circular and may be formed densely in a lateral direction in comparison with other long marks. Thus, if the size of the 2Tw marks 403 is formed smaller in the lateral direction than the size of the other marks, the smallest amplitude I2 of the reproduction signal 120b in FIG. 11 is then smaller than the smallest amplitude I2 of the reproduction signal 120a in FIG. 11 due to the effect of MTF. Hence, the intercode interference of the 2Tw marks 403 increases and a reproduction peak shift is generated.

In the case of the reproduction frequency characteristic of the waveform equalizer 103 shown in FIG. 10, when the peak boost value (Bp) is increased, the noise is increased at the same time as the amplitude of the reproduction signal 120 is increased. In particular, when an overboost state is assumed, the noise at bandwidths above the signal bandwidth is increased and, in this case, there may be an adverse effect whereby the quality of the reproduction signal 120 suffers. Further, in an overboost state, the intercode interference of the lower bandwidths (4Tw to 8Tw) among the signal components is increased, thereby impairing the reproduction characteristic. Thus, in a case where recording marks such as the 2Tw marks are formed particularly small in comparison with other marks, with recording compensation of mark length alone, it is possible to compensate for intercode interference of 2Tw marks, but the reproduction signal characteristic where residual intercode interference pertaining to spaces exists is adversely affected.

Therefore, as described in the above embodiment, by considering 2Tw spaces at the time of mark recording in particular, the pulse edge of the recording pulse signal 125 is varied by the edge variation amounts dTS1, dTS2 and dTE1 which correspond to the mark length, anterior space length, and posterior space length and the leading edge or trailing edge of the recording pulse signal 125 are compensated. Accordingly, intercode interference which is generated by 2Tw spaces in particular can be reduced and the characteristic of the reproduction signal 120 can be improved even with a low boost value.

In addition, if data is recorded on an optical recording medium where recording marks such as the mark array 300b in FIG. 11 are formed, such as a recordable recording medium, the target boost value when recording compensation is performed is also dependent on the compensation accuracy of the recording compensation. For example, if recording compensation is performed with compensation accuracy on the order of about Tw/32, for example, recording by increasing the boost value by about 1 dB to 2 dB is desirable. Further, at the time of trial writing, recording may be carried out initially in a state without space compensation, and a recording operation which includes space compensation may be performed only in cases where a reproduction signal characteristic such as the error rate does not satisfy a reference value.

Further, a first trial write may be performed using a code array obtained by removing the shortest mark length from a pre-recorded signal, and a recording compensation table for mark lengths of 3Tw or more may be created, and subsequently a second trial write may be performed using a code array which includes a 2Tw signal, and a recording compensation table which includes mark lengths of 2Tw may be created. In a case where the reproduction signal amplitude is very small as in the case of the reproduction signal 120b in FIG. 11, if the recording mark position of the 2Tw signal is not correct, it may be difficult to accurately combine marks of a length of 3Tw or more with space positions. In a case where a signal with very large intercode interference as described earlier is reproduced, marks with a code length of 3Tw or more are initially recorded and the edge positions of the marks and spaces of 3Tw or more are subjected to accurate recording compensation, and thereafter a signal including a 2Tw signal is recorded and the recording position of 2Tw marks and spaces is accurately compensated for. As a result, information can be recorded more accurately and efficiently and the reproduction signal quality can be improved.

In addition, when a signal of a code length of 3Tw or more is recorded as described above, recording compensation may be performed after lowering the boost value of the reproduction equalizer from 1 dB to 2 dB in comparison with when recording a normal recording code array which includes a 2Tw signal. In this case, because the 2Tw signal is not included, the amplitude of the reproduction signal is relatively large and the generation of intercode interference is slow. For this reason, a signal with a minimal edge shift can be recorded by adjusting the edge position of a mark with a long mark length by using a boost value a little below a normal boost value.

Further, in a rewritable optical recording medium, a signal which is recorded by means of plural rewrites must be accurately reproduced. With regard to the error rate when a recorded signal is reproduced, if the symbol error rate (SER) is $2.0 \times 10^{-4}$ or less, this represents a level that is not problematic.

Figure 12:
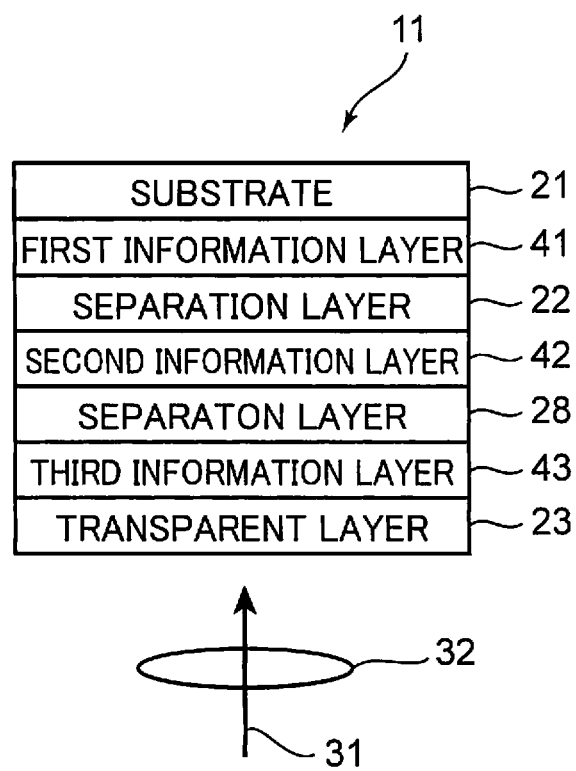
FIG. 12 is a partial cross section showing an optical information recording medium according to the embodiment of the present invention.

An example of an optical information recording medium according to the embodiment of the present invention will be described next. FIG. 12 is a partial cross section showing the optical recording medium 11 according to the embodiment of the present invention. Suppose that the optical recording medium 11 is, by way of example, a triple-layer multilayered optical recording medium capable of recording or reproducing information by irradiating a laser beam 31 which is focused by an objective lens 32.

When the wavelength $\lambda$ of the laser beam 31 grows shorter, it is possible to focus on a small spot diameter by means of the objective lens 32, but when the wavelength $\lambda$ is too short, the light absorption of the laser beam 31 by a transparent layer 23 or the like is then large. Hence, the wavelength $\lambda$ of the laser beam 31 is preferably in the range 350 nm to 450 nm.

On the optical recording medium 11, three information layers, namely, a first information layer 41, a second information layer 42, and a third information layer 43, and a transparent layer 23 are provided in the foregoing order and sequentially laminated on a substrate 21 via separation layers 22 and 28.

The objective lens 32 records or reproduces information on the optical recording medium 11 by focusing the laser beam 31 on each information layer starting with the transparent layer 23.

In the optical recording medium 11, the laser beam and the reflected light which reach the information layer closer to the substrate 21 than the third information layer 43 is attenuated as a result of passing, from the former information layer, through the information layer on the entry side of the laser beam 31. Hence, the first information layer 41 and the second information layer 42 must comprise a high recording sensitivity and a high reflectance and the second information layer 42 and the third information layer 43 must comprise a high transmittance.

The substrate 21 has a disc-like shape and is used to hold each layer from the first information layer 41 to the transparent layer 23. A guide grove for guiding the laser beam 31 may also be formed on the surface, of the substrate 21, which is on the side of the first information layer 41. The surface, of the substrate 21, which is on the side of the first information layer 41 is preferably planar. For the material of the substrate 21, a polycarbonate resin, a polymethylmethacrylate resin, a polyolefin resin, a norbornene resin, glass, or a material obtained by suitably combining the foregoing can be used. Polycarbonate resin in particular possesses superior transferability and producibility and is low cost, and is therefore preferable as the material of the substrate 21.

The separation layer 22 and the separation layer 28 are layers which are provided in order to differentiate the respective focus positions of the first information layer 41, the second information layer 42, and the third information layer 43 of the optical recording medium 11. The thicknesses of the separation layer 22 and the separation layer 28 are desirably equal to or greater than the focal depth determined from the numerical aperture NA of the objective lens 32 and the wavelength $\lambda$ of the laser beam 31. If, on the other hand, the separation layer 22 and the separation layer 28 are too thick, the distance from the side, of the optical recording medium 11, where the laser beam 31 enters to the first information layer 41 is long and the comatic aberration when the optical recording medium 11 is tilted is large, and hence it is not possible to accurately focus on the first information layer 41. At this point, the separation layer 22 and the separation layer 28 are preferably thin. Conversely, if the wavelength $\lambda$ of the laser beam 31 is 405 nm and the numerical aperture NA of the objective lens 32 is 0.85, the thicknesses of the separation layer 22 and the separation layer 28 are preferably within the range 5 µm to 50 µm.

The separation layer 22 and the separation layer 28 preferably have minimal light absorption to the laser beam 31. A guide groove for guiding the laser beam 31 may also be formed on the surface, of the separation layer 22 and the separation layer 28, on the irradiation side of the laser beam 31. For the material of the separation layer 22 and the separation layer 28, a polycarbonate resin, a polymethylmethacrylate resin, a polyolefin resin, a norbornene resin, an ultraviolet curable resin, a slow-acting heat curable resin, glass, or a material obtained by suitably combining the foregoing can be used.

The transparent layer 23 is on the laser beam 31 entry side of the third information layer 43 and protects the third information layer 43. The transparent layer 23 preferably has minimal light absorption to the laser beam 31. For the material of the transparent layer 23, a polycarbonate resin, a polymethylmethacrylate resin, a polyolefin resin, a norbornene resin, an ultraviolet curable resin, a slow-acting heat curable resin, glass, or a material obtained by suitably combining the foregoing can be used. Furthermore, for the material of the transparent layer 23, a sheet made of these materials may be used.

When the thickness of the transparent layer 23 is too thin, the function of protecting the third information layer 43 cannot be realized. In addition, when the thickness of the transparent layer 23 is too thick, as per the case with the separation layer 22 and the separation layer 28, the distance from the side, of the optical recording medium 11, where the laser beam 31 enters to the first information layer 41 is long and the comatic aberration when the optical recording medium 11 is tilted is large, and hence it is not possible to accurately focus on the first information layer 41. Conversely, if the numerical aperture NA of the objective lens 32 is 0.85, the thickness of the transparent layer 23 is preferably within the range 5 µm to 150 µm and more preferably within the range 40 µm to 110 µm.

Figure 13:
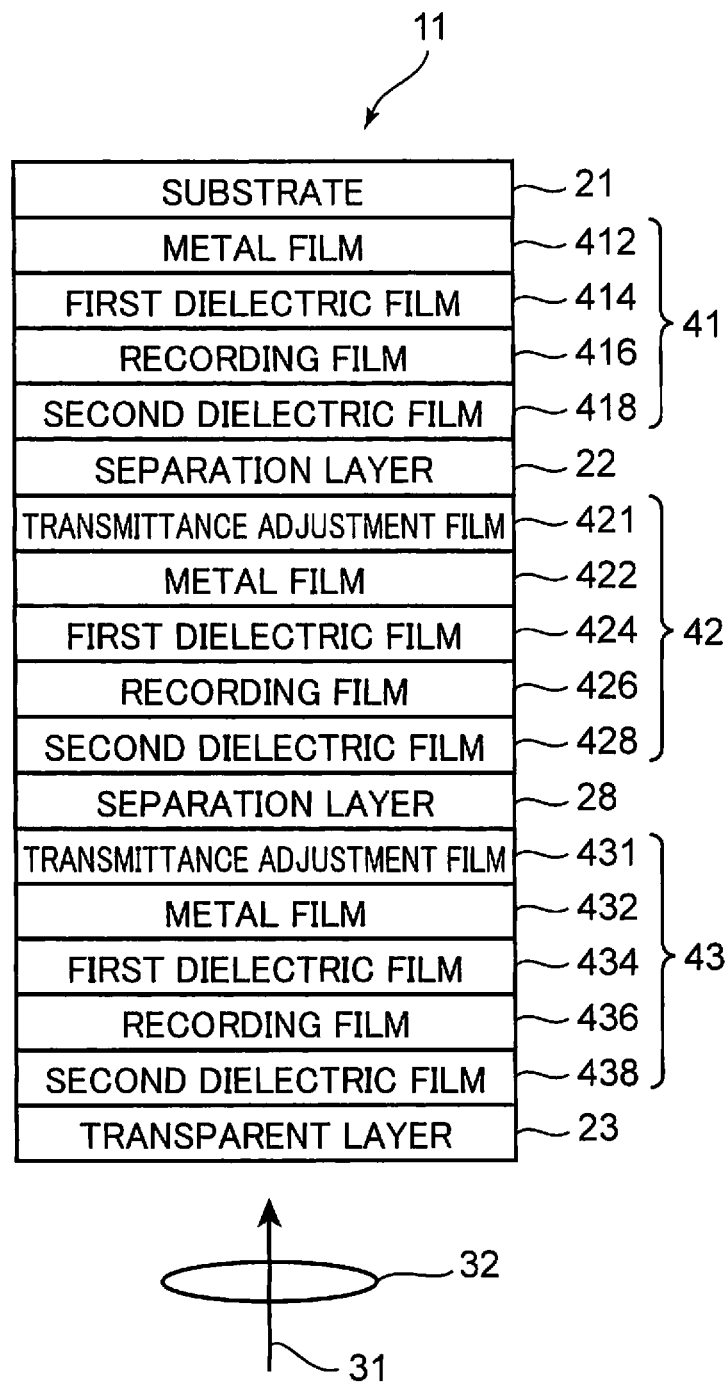
FIG. 13 is a partial cross section which shows in more detail each information layer of the optical information recording medium according to the embodiment of the present invention.

Furthermore, FIG. 13 is a partial cross section which shows in more detail each information layer of the optical recording medium 11 according to the embodiment of the present invention.

As shown in FIG. 13, provided on the first information layer 41 starting from the side close to the substrate 21 are a metal film 412, a first dielectric film 414, a recording film 416, and a second dielectric film 418 in that order. In addition, if necessary, a metal film-side interface film 413 may be provided between the metal film 412 and the first dielectric film 414, a first interface film 415 may be provided between the first dielectric film 414 and the recording film 416, and a second interface film 417 may be provided between the second dielectric film 418 and the recording film 416. Note that the metal film-side interface film 413, the first interface film 415, and the second interface film 417 are not illustrated.

Similarly, provided on the second information layer 42 starting from the side close to the substrate 21 are a transmittance adjustment film 421, a metal film 422, a first dielectric film 424, a recording film 426, and a second dielectric film 428 in that order. In addition, if necessary, a metal film-side interface film 423 may be provided between the metal film 422 and the first dielectric film 424, a first interface film 425 may be provided between the first dielectric film 424 and the recording film 426, and a second interface film 427 may be provided between the second dielectric film 428 and the recording film 426. Note that the metal film-side interface film 423, the first interface film 425, and the second interface film 427 are not illustrated.

Similarly, provided on the third information layer 43 starting from the side close to the substrate 21 are a transmittance adjustment film 431, a metal film 432, a first dielectric film 434, a recording film 436, and a second dielectric film 438 in that order. In addition, if necessary, a metal film-side interface film 433 may be provided between the metal film 432 and the first dielectric film 434, a first interface film 435 may be provided between the first dielectric film 434 and the recording film 436, and a second interface film 437 may be provided between the second dielectric film 438 and the recording film 436. Note that the metal film-side interface film 433, the first interface film 435, and the second interface film 437 are not illustrated.

Each of the films constituting the first information layer 41 will be described next.

The recording film 416 is a film which brings about an inverse phase change between a crystalline phase and a noncrystalline phase through irradiation of the laser beam 31. Materials which can be used as materials of the recording film 416 include any of (Ge—Sn)Te, GeTe—$Sb_2Te_3$, (Ge—Sn)Te—$Sb_2Te_3$, GeTe—$Bi_2Te_3$, GeTe—$In_2Te_3$, (Ge—Sn)Te—$Bi_2Te_3$, GeTe—(Sb—Bi)$_2Te_3$, (Ge—Sn)Te—(Sb—Bi)$_2Te_3$, GeTe—(Bi—In)$_2Te_3$, (Ge—Sn)Te—(Bi—In)$_2Te_3$, Sb—Te, Sb—Ge, (Gb—Te)—Ge, Sb—In, (Sb—Te)—In, Sb—Ga and (Sb—Te)—Ga. The recording film 416 is preferably capable of changing easily from a noncrystalline phase to a crystalline phase when the laser beam is irradiated during recording and preferably not capable of changing from the noncrystalline phase to the crystalline phase when the laser beam is not irradiated.

When the thickness of the recording film 416 is too thin, an adequate reflectance rate, reflectance variation, and erasure rate are no longer obtained. When the thickness of the recording film 416 is too thick, the recording sensitivity drops because the thermal capacity is large. Hence, the thickness of the recording film 416 is preferably in the range 6 nm to 15 nm and more preferably in the range 8 nm to 12 nm.

The metal film 412 possesses an optical function of increasing the light amount absorbed by the recording film 416 and a thermal function of scattering the heat generated in the recording film 416. Materials which can be used for the metal film 412 include at least one element among Ag, Au, Cu, and Al. Materials which can be used for the metal film 412 include, for example, alloys such as Ag—Cu, Ag—Ga—Cu, Ag—Pd—Cu, Ag—Nd—Au, AlNi, AlCr, Au—Cr, or Ag—In. Ag alloy in particular has a large thermal conductivity and is preferable as a material for the metal film 412. The greater the thickness of the metal film 412, the higher the thermal scatter function. However, when the thickness of the metal film 412 is too large, the thermal conductivity function is too high and the recording sensitivity of the recording film 416 drops. Hence, the thickness of the thermal film 412 is preferably within the range 30 nm to 200 nm, and more preferably 70 nm to 140 nm.

The first dielectric film 414 is between the recording film 416 and the metal film 412 and possesses a thermal function of adjusting the thermal scatter from the recording film 416 to the metal film 412 and an optical function of adjusting the reflectance and absorption rate and the like. Materials which can be used for the material of the first dielectric film 414 include, for example, oxides such as $ZrO_2$, $HfO_2$, ZnO, $SiO_2$, $SnO_2$, $Cr_2O_3$, $TiO_2$, $In_2O3$, $Ga_2O_3$, $Y_2O_3$, $CeO_2$, or $DyO_2$, sulfides such as ZnS or CdS, sulfide simple substances such as SiC, or mixtures of the foregoing. Mixtures which can be used include, for example, $ZrO_2$—$SiO_2$, $ZrO_2$—$SiO_2$—$Cr_2O_3$, $ZrO_2$—$SiO_2$—$Ga_2O_3$, $HfO_2$—$SiO_2$—$Cr_2O_3$, $ZrO_2$—$SiO_2$—$In_2O_3$, ZnS—$SiO_2$, or $SnO_2$—SiC. ZnS—$SiO_2$ in particular excels as a material for the first dielectric film 414. ZnS—$SiO_2$ possesses a fast film deposition rate, is transparent, and possesses good mechanical properties and good moisture resistance.

When the thickness of the first dielectric film 414 is too thick, the cooling effect of the metal film 412 weakens, there is minimal thermal scatter from the recording film 416, and hence an amorphous transformation is difficult. Further, when the thickness of the first dielectric film 414 is too thin, the cooling effect of the metal film 412 is strong and the thermal scatter from the recording film 416 is large and the sensitivity drops. Hence, the thickness of the first dielectric film 414 is preferably in the range 5 nm to 40 nm and more preferably in the range 8 nm to 30 nm.

The metal film-side interface film 413 acts to prevent corrosion or damage of the metal film 412 by way of the material of the first dielectric film 414. More specifically, the metal film-side interface film 413 prevents corrosion due to the reaction between Ag and S when a material which includes silver (Ag) is used for the metal film 412 and a material which includes sulfur (S) (ZnS—$SiO_2$, for example) for the first dielectric film 414.

For the material of the metal film-side interface film 413, a metal other than Ag, for example Al or an Al alloy, can be used.

Further, as materials of the metal film-side interface film 413, it is possible to use a dielectric material which does not contain sulfur (S), for example oxides such as $ZrO_2$, $HfO_2$, ZnO, $SiO_2$, $SnO_2$, $Cr_2O_3$, $TiO_2$, $In_2O_3$, $Ga_2O_3$, $Y_2O_3$, $CeO_2$, or $DyO_2$, sulfide simple substances such as SiC, or mixtures of the foregoing. Mixtures which can be used include, for example, $ZrO_2$—$SiO_2$, $ZrO_2$—$SiO_2$—$Cr_2O_3$, $ZrO_2$—$SiO_2$—$Ga_2O_3$, $HfO_2$—$SiO_2$—$Cr_2O_3$, $ZrO_2$—$SiO_2$—$In_2O_3$, or the $SnO_2$—SiC. Alternatively, carbon (C) or the like can be used as the material of the metal film-side interface film 413.

When the thickness of the metal film-side interface film 413 is too large, then the thermal and optical action of the first dielectric film 414 is impeded. Further, when the thickness of the metal film-side interface film 413 is too thin, the function to prevent corrosion and damage to the metal film 412 is reduced. Therefore, the thickness of the metal film-side interface film 413 is preferably within the range 1 nm to 100 nm and more preferably within the range 5 nm to 40 nm.

The first interface film 415 acts to prevent physical movement generated between the first dielectric film 414 and recording film 416 through repeated recording. The first interface film 415 is preferably made of a material with a melting point high enough not to melt during recording and with good sealability with the recording film 416. Materials which can be used for the material of the first interface film 415 include, for example, oxides such as $ZrO_2$, $HfO_2$, ZnO, $SiO_2$, $SnO_2$, $Cr_2O_3$, $TiO_2$, $In_2O_3$, $Ga_2O_3$, $Y_2O_3$, $CeO_2$, or $DyO_2$, sulfides such as ZnS or CdS, sulfide simple substances such as SiC, or mixtures of the foregoing. Mixtures which can be used include, for example, $ZrO_2$—$SiO_2$, $ZrO_2$—$SiO_2$—$Cr_2O_3$, $ZrO_2$—$SiO_2$—$Ga_2O_3$, $HfO_2$—$SiO_2$—$Cr_2O_3$, $ZrO_2$—$SiO_2$—$In_2O_3$, ZnS—$SiO_2$, or $SnO_2$—SiC. Further, materials which can be used for the first interface film 415 include carbon (C) and the like. $Ga_2O_3$, ZnO or $In_2O_3$ in particular, or the like, is preferably used as the material for the first interface film 415. $Ga_2O_3$, ZnO, or $In_2O_3$ preferably have good sealability to the recording film 416.

When the thickness of the first interface film 415 is too thin, its effect as an interface film cannot be achieved. Further, when the thickness of the first interface film 415 is too thick, the thermal and optical action of the first dielectric film 414 are impeded. Hence, the thickness of the first interface film 415 is preferably in the range 0.3 nm to 15 nm and more preferably in the range 1 nm to 8 nm.

The second dielectric film 418 is on the side where the laser beam enters from the recording film 416 and possesses a function to prevent corrosion and deformation and the like of the recording film 416 and an optical function to adjust the reflectance or absorption rate and the like. Further, as the material for the second dielectric film 418, the same materials as for the first dielectric film 414 can be used. ZnS—SiO$_2$ in particular excels as a material for the second dielectric film 418. ZnS—SiO$_2$ possesses a fast film deposition rate, is transparent, and possesses good mechanical properties and good moisture resistance.

When the thickness of the second dielectric film 418 is too thin, the function to prevent corrosion and deformation, and the like, to the recording film 416 is reduced. Further, the thickness of the second dielectric film 418 can, using matrix method-based calculations, be determined exactly so as to satisfy the condition that there be a large variation between the reflected light amount from the recording film 416 which is a crystalline phase and the recording film 416 which is a noncrystalline phase. The thickness of the second dielectric film 418 is preferably in the range 20 nm to 80 nm.

Similarly to the first interface film 415, the second interface film 417 acts to prevent physical movement which is produced between the second dielectric film 418 and the recording film 416 as a result of repeated recording. The material for the second interface film 417 is therefore preferably a material which possesses the same performance as the first interface film 415.

Similarly to the first interface film 415, the thickness of the second interface film 417 is preferably in the range 0.3 nm to 15 nm and more preferably in the range 1 nm to 8 nm.

The first information layer 41 is configured from a metal film 412, a first dielectric film 414, a recording film 416, and a second dielectric film 418, and, if necessary, a metal film-side interface film 413, a first interface film 415, and a second interface film 417 are added to the first information layer 41.

Each of the films constituting the second information layer 42 will be described next.

As the material of the recording film 426, the same material as the recording film 416 of the first information layer 41 can be used. In order to raise the transmittance of the second information layer 42, the thickness of the recording film 426 is preferably no more than 10 nm, and more preferably in the range 5 nm to 9 nm.

The metal film 422 possesses the same functions as the metal film 412 of the first information layer 41. That is, the metal film 422 possesses an optical function of increasing the light amount absorbed by the recording film 426 and a thermal function of scattering the heat generated in the recording film 426. Hence, the same materials as for the metal film 412 of the first information layer 41 can be used as the material for the metal film 422. Ag alloy in particular has a large thermal conductivity and is preferable as a material for the metal film 422.

In order to increase the transmittance of the second information layer 42, the thickness of the metal film 422 is preferably no more than 20 nm and more preferably in the range 6 nm to 14 nm. The thickness of the metal film 422 is in the range 6 nm to 14 nm and hence the optical and thermal functions of the metal film 422 are adequate.

The first dielectric film 424 possesses the same functions as the first dielectric film 414 of the first information layer 41. That is, the first dielectric film 424 possesses a thermal function of adjusting the thermal scatter from the recording film 426 to the metal film 422 and an optical function of adjusting the reflectance and absorption rate and the like. For this reason, the same materials as for the first dielectric film 414 of the first information layer 41 can be used for the material of the first dielectric film 424.

The thickness of the first dielectric film 424 is preferably in the range 1 nm to 40 nm and more preferably in the range 4 nm to 30 nm so that the optical and thermal functions are adequate.

The second dielectric film 428 possesses the same functions as the second dielectric film 418 of the first information layer 41. That is, the second dielectric film 428 possesses a function to prevent corrosion and deformation and the like of the recording film 426 and an optical function to adjust the reflectance or absorption rate and the like. For this reason, the same materials as for the second dielectric film 418 of the first information layer 41 can be used for the material of the second dielectric film 428. The thickness of the second dielectric film 428 can, using matrix method-based calculations, be determined exactly so as to satisfy the condition that there be a large variation between the reflected light amount from the recording film 426 which is a crystalline phase and the recording film 426 which is a noncrystalline phase.

The transmittance adjustment film 421 comprises a dielectric and possesses a function to adjust the transmittance of the second information layer 42. With this transmittance adjustment film 421, the transmittance Tc (%) of the second information layer 42 in a case where the recording film 426 is a crystalline phase and the transmittance Ta (%) of the second information layer 42 in a case where the recording film 426 is a noncrystalline phase can both be increased.

Materials which can be used as the material of the transmittance adjustment film 421 include oxides such as $TiO_2$, $ZrO_2$, $HfO_2$, $ZnO$, $Nb_2O_5$, $Ta_2O_5$, $Al_2O_3$, $SiO_2$, $Cr_2O_3$, $CeO_2$, $Ga_2O_3$, or $Bi_2O_3$, nitrides such as Ti—N, Zr—N, Nb—N, Ge—N, Cr—N, or Al—N, sulfide simple substances such as ZnS, or mixtures of the foregoing. The refractive index nt and the extinction coefficient kt of the transmittance adjustment film 421 are preferably nt≥2.4 and kt≤0.1 in order to raise the transmittance Tc and the transmittance Ta. Hence, among the materials above, $TiO_2$ or a material which contains $TiO_2$ is preferably used as the material of the transmittance adjustment film 421. These materials have a large refractive index nt (nt=2.6 to 2.8) and a small extinction coefficient kt (kt=0.0 to 0.1). Hence, the transmittance adjustment film 421 formed using these materials effectively raises the transmittance of the second information layer 42.

When the thickness of the transmittance adjustment film 421 is approximately $\lambda/8$ nt (where $\lambda$ is the wavelength of the laser beam 31, and nt is the refractive index of the material of the transmittance adjustment film 421), the effect of raising the transmittance Tc and the transmittance Ta is large. Conversely, if the wavelength $\lambda$ of the laser beam 31 is 405 nm and the refractive index nt of the material of the transmittance adjustment film 421 is 2.6, the thickness of the transmittance adjustment film 421 is preferably in the range 5 nm to 36 nm to also take into account other conditions such as the reflectance.

The metal film-side interface film 423, the first interface film 425, and the second interface film 427 each possess the same functions as the metal film-side interface film 413, the first interface film 415, and the second interface film 417 of the first information layer 41. Furthermore, the metal film-side interface film 423, the first interface film 425, and the second interface film 427 can each employ the same materials as for the metal film-side interface film 413, the first interface film 415, and the second interface film 417 of the first information layer 41.

Each of the films constituting the third information layer 43 will be described next.

The films constituting the third information layer 43 each possess the same function as each corresponding film constituting the second information layer 42. Further, the same materials as for each of the films constituting the second information layer 42 can be used for the corresponding films constituting the third information layer 43.

Since the third information layer 43 requires a higher transmittance than the second information layer 42, the film thickness of films for which a material with a large extinction coefficient is used, such as the recording film and metal film, must be made thin. Hence, the film thickness of the recording film 436 of the third information layer 43 is preferably made thinner than the film thickness of the recording film 426 of the second information layer 42.

The optical recording medium 11 can be fabricated by the method described hereinbelow.

First, the first information layer 41 is laminated on a substrate 21 with a thickness of 1.1 mm, for example. Although the first information layer 41 comprises a multilayered film, each film of the first information layer 41 can be formed by sequential sputtering. Note that the substrate 21 is highly moisture resistant depending on the material of the substrate 21. Hence, if necessary, substrate annealing may be performed to remove moisture before sputtering.

Each film of the first information layer 41 can be formed by sputtering a sputtering target of the material constituting each film in a rare earth gas atmosphere of Ar gas, Kr gas, or Xe gas or the like, or in a mixed gas atmosphere of a rare earth gas and a reactive gas (at least one gas selected from oxygen gas and nitrogen gas). As the sputtering method, DC sputtering and RF sputtering may be used according to requirements. Normally, although DC sputtering is preferable due to the increased film deposition rate, there may be cases where sputtering cannot be performed using DC sputtering, as with a material which possesses low conductivity such as a dielectric material. Hence, a film which contains a material with low conductivity is sputtered using RF sputtering. Note that sputtering can be performed by means of DC sputtering or pulse DC sputtering in cases where the material is a dielectric material but possesses high conductivity or where the material has increased conductivity incorporated during fabrication of the sputtering target.

The composition of each film that is deposited through sputtering may not completely match the composition of the original sputtering target. For example, in the case of an oxide, oxygen damage is easily caused by sputtering. In this case, oxygen damage can be compensated for by using oxygen gas as the reactive gas. The composition of the sputtering target is determined so that the film deposited by sputtering is of the desired composition. Note that, for the sputtering target and a film which has been deposited through sputtering, the composition can be confirmed by analyzing using an X-ray micro-analyzer, for example.

In the fabrication of the optical recording medium 11, more specifically, the metal film 412 is first deposited on the substrate 21. The metal film 412 can be formed by DC-sputtering a sputtering target comprising a metal or an alloy which constitutes the metal film 412 in a rare earth gas atmosphere or in a mixed gas atmosphere of rare earth gas and reactive gas.

The metal film-side interface film 413 is subsequently deposited on the metal film 412 if necessary. The metal film-side interface film 413 can be formed by sputtering a sputtering target made of the material to constitute the metal film-side interface film 413 in a rare earth gas atmosphere or in a mixed gas atmosphere of rare earth gas and reactive gas. In a case where the material of the metal film-side interface film 413 is a material of high conductivity such as a metal, DC sputtering may be used, and in the case of a material of low conductivity such as an oxide, RF sputtering may be used.

The first dielectric film 414 is then deposited on the metal film-side interface film 413 or the metal film 412. The first dielectric film 414 can be formed by performing sputtering of a sputtering target made of the material which is to constitute the first dielectric film 414 mainly by means of RF sputtering in a rare earth gas atmosphere or in a mixed gas atmosphere of rare earth gas and reactive gas. The use of RF sputtering is dependent on there being a lot of materials of low conductivity constituting the first dielectric film 414 and DC sputtering not being suitable.

The first interface film 415 is subsequently deposited on the first dielectric film 414 if necessary. The first interface film 415 can be formed by sputtering a sputtering target made of the material which is to constitute the first interface film 415 mainly by means of RF sputtering in a rare earth gas atmosphere or in a mixed gas atmosphere of rare earth gas and reactive gas.

The recording film 416 is then deposited on the first interface film 415 or the first dielectric film 414. The recording film 416 can be formed by sputtering a sputtering target made of the material which is to constitute the recording film 416 mainly by means of DC sputtering in a rare earth gas atmosphere or in a mixed gas atmosphere of rare earth gas and reactive gas.

The second interface film 417 is then deposited on the recording film 416 if necessary. The second interface film 417 can be formed by sputtering a sputtering target made of the material which is to constitute the second interface film 417 mainly by means of RF sputtering in a rare earth gas atmosphere or in a mixed gas atmosphere of rare earth gas and reactive gas.

The second dielectric film 418 is subsequently deposited on the second interface film 417 or the recording film 416. The second dielectric film 418 can be formed by sputtering a sputtering target made of the material which is to constitute the second dielectric film 418 mainly by means of RF sputtering in a rare earth gas atmosphere or in a mixed gas atmosphere of rare earth gas and reactive gas.

The first information layer 41 is accordingly stacked on the substrate 21 and subsequently the separation layer 22 can be formed on the first information layer 41. The separation layer 22 can be formed as follows. First, an ultraviolet curable resin (an acrylic resin or epoxy resin, for example) or a slow-acting heat curable resin is applied on the first information layer 41. Subsequently, by rotating the whole body, resin is uniformly extended (spin coating), and the resin is then cured. Note that if the separation layer 22 comprises a guide groove for guiding the laser beam 31, the substrate (mold) in which the groove is formed has resin first stuck to same prior to curing. In this state, the whole body is rotated and subjected to spin coating and, after the resin is cured, the substrate (mold) is peeled off. The guide groove can be accordingly formed in the separation layer 22.

The recording resin 416 of the first information layer 41 is normally in a state where film deposition has been made (as-deposited state) in a noncrystalline state. Accordingly, an initialization process to crystallize the recording film 416 may be carried out by irradiating the laser beam if necessary. Note that the initialization process may also be carried out after the formation of the other information layers is complete.

Further, the film thickness of the recording film may become thin as a result of the recording film being changed from a noncrystalline state to a crystalline state due to initialization. Typically, the film thickness of the recording film is about 2% to 9% thinner than the original film thickness as a result of initialization.

The second information layer 42 is subsequently formed on the separation layer 22.

More specifically, the transmittance adjustment film 421 is first deposited on the separation layer 22. The transmittance adjustment film 421 can be formed by sputtering a sputtering target made of the material which is to constitute the transmittance adjustment film 421 by means of RF sputtering or DC sputtering in a rare earth gas atmosphere or in a mixed gas atmosphere of rare earth gas and reactive gas.

The metal film 422 is then deposited on the transmittance adjustment film 421. The metal film 422 can be formed using the same method as the metal film 412 of the first information layer 41.

The metal film-side interface film 423 is then deposited on the metal film 422 if necessary. The metal film-side interface film 423 can be formed by means of the same method as the metal film-side interface film 413 of the first information layer 41.

The first dielectric film 424 is subsequently deposited on the metal film-side interface film 423 or the metal film 422. The first dielectric film 424 can be formed by the same method as the first dielectric film 414 of the first information layer 41.

The first interface film 425 is subsequently deposited on the first dielectric film 424 if necessary. The first interface film 425 can be formed by means of the same method as the first interface film 415 of the first information layer 41.

The recording film 426 is then deposited on the first interface film 425 or the first dielectric film 424. The recording film 426 can be formed by means of the same method as the recording film 416 of the first information layer 41.

The second interface film 427 is subsequently deposited on the recording film 426 if necessary. The second interface film 427 can be formed by means of the same method as the second interface film 417 of the first information layer 41.

The second dielectric film 428 is then deposited on the second interface film 427 or the recording film 426. The second dielectric film 428 can be formed by means of the same method as the second dielectric film 418 of the first information layer 41.

The second information layer 42 is thus stacked on the separation layer 22 and the separation layer 28 is subsequently formed on a second separation layer 42. The separation layer 28 can be formed by means of the same method as the separation layer 22.

Note that after the second dielectric film 428 has been deposited, or after the separation layer 28 has been formed, an initialization process of crystallizing the recording film 426 by irradiating a laser beam or the like if necessary may be carried out. Note that the initialization process may also be performed after the formation of the other information layers has ended.

The third information layer 43 is subsequently stacked on the separation layer 28.

More specifically, the transmittance adjustment film 431, the metal film 432, the first dielectric film 434, the recording film 436, and the second dielectric film 438 are sequentially stacked on the separation layer 28. Thereupon, if necessary, the metal film-side interface film 433 may be deposited between the metal film 432 and the first dielectric film 434, the first interface film 435 may be deposited between the first dielectric film 434 and the recording film 436, and the second interface film 437 may be deposited may be deposited between the second dielectric film 438 and the recording film 436. Each of the films of the third information layer 43 can be formed by means of the same method as each of the films of the second information layer 42.

After the third information layer 43 has been deposited accordingly on the separation layer 28, the transparent layer 23 is formed on the third information layer 43.

The transparent layer 23 can be formed as follows. First, an ultraviolet curable resin (an acrylic resin or epoxy resin, for example) or a slow-acting heat curable resin is applied on the third information layer 43 and spin-coated, and then the resin is cured. Further, the transparent layer 23 may be formed by using a disc-shaped polycarbonate resin, a polymethylmethacrylate resin, a polyolefin resin, or a norbornene resin. Further, the transparent layer 23 may be formed using a disc-shaped plate or sheet made of glass or the like. In this case, the transparent layer 23 can be formed by applying an ultraviolet curable resin or a slow-acting heat curable resin on the third information layer 43, sticking the plate or sheet to the applied resin, and then spin-coating, and then curing the curable resin. Note that as another formation method, a sticky resin can be uniformly pre-applied to the plate or sheet and then the plate or sheet can be made to stick to the second dielectric film 438.

Note that, after the second dielectric film 438 has been deposited or after the transparent layer 23 has been formed, an initialization process to crystallize the recording film 436 may be carried out by irradiating a laser beam or the like, if necessary. Further, an initialization process to crystallize the recording film 416 of the first information layer and the recording film 426 of the second information layer may be carried out after the transparent layer 23 is formed and before the initialization process to crystallize the recording film 436 of the third information layer.

The optical recording medium 11 can be fabricated as above. Note that, although sputtering is used as the film deposition method for each layer constituting the information layers in this embodiment, the present invention is not limited to such a method, rather, vacuum deposition, ion plating, or MBE (Molecular Beam Epitaxy) or the like can also be employed.

Further, although an optical recording medium 11 comprising three information layers has been described in this embodiment, fabrication is also possible using the same methods as described above even in a case where there are two information layers or in a case where there are four or more information layers.

In an optical information recording medium which comprises a plurality of information layers, the transmittance of each information layer must be raised as high as the information layer on the side where the laser beam enters. By way of example, in a case where a laser beam with a wavelength of 405 nm and an objective lens with an NA of 0.85 are used to record or reproduce information, in a Blu-ray disc which comprises three information layers with a diameter of 12 cm and a recording capacity per side of 33.4 GB, the transmittance of the second information layer is preferably 40% to 55% and the transmittance of the third information layer is preferably 45% to 65%.

In order to obtain a high transmittance, a recording film made of a phase-change material with a large extinction coefficient must be made thin. However, typically, in the case of a rewritable optical recording medium, when the thickness of the recording film made of a phase-change material is thin, the crystallization rate is then slow. For this reason, a phase change from a noncrystalline phase to a crystalline phase is hard to produce and the information erasure performance suffers. In order to set the transmittance of the third information layer higher than the transmittance of the second information layer, the thickness of the recording film of the third information layer is made thinner than the thickness of the recording film of the second information layer. Here, the recording method must be devised in order to satisfy the level actually required for the erasure performance of the third information layer.

In addition, the substantial reflectance of each information layer is calculated by multiplying the transmittance of each information layer two times by the film reflectance which does not include attenuation caused by passage through the other information layers, and the reflectance of the information layers remote from the laser beam entry surface tends to be low. However, typically, the ratio between the reflectances of two different information layers is preferably between 0.5 and 2.0. Further, in addition to the second information layer having a high transmittance, the film reflectance must be much higher (about three times higher) than the film reflectance of the third information layer.

However, when the film reflectance is set high in an information layer requiring light transmittance, there tends to be a small ratio between the reflectance of the recording film which is crystalline and the reflectance of the recording film which is noncrystalline, and the signal amplitude is therefore small. The recording method must be devised to produce favorable reproduction signal quality of the second information layer.

EXAMPLES

The present invention will be described more specifically hereinbelow by means of specific examples.

In this example, the present inventors created an optical recording medium 11 in FIG. 12, and studied the recording properties and reproduction properties of each information layer of the first information layer 41, the second information layer 42, and the third information layer 43.

A sample of the optical recording medium was fabricated as follows. First, as a substrate 21, a polycarbonate substrate (of diameter 120 mm and thickness 1.1 mm) in which is formed a guide groove (of depth 20 nm and track pitch 0.32 µm) for guiding a laser beam 31 is prepared.

Further, films were sequentially stacked through sputtering on the polycarbonate substrate, namely, an Ag—Ga—Cu film (thickness: 100 nm) as the metal film 412, a $ZrO_2$—$Cr_2O_3$ film (thickness: 18 nm) as the first dielectric film 414, a GeTe—$Sb_2Te_3$ film (thickness: 10 nm) as the resin film 416, a $ZrO_2$—$Cr_2O_3$ film (thickness: 5 nm) as the second interface film 417 (not shown), and then a ZnS—$SiO_2$ film (thickness: 65 nm) as the second dielectric film 418.

Subsequently an ultraviolet curable resin was applied on the second dielectric film 418 and a substrate with a guide groove (depth 20 nm, track pitch 0.32 µm) formed in its top was made to cover and stick to the resin and rotated. Accordingly, a uniform resin layer was formed. The substrate was peeled off after the resin was cured. As a result, a 25 µm thick separation layer 22, in whose second information layer 42 side a guide groove for guiding the laser beam 31 was obtained, was obtained.

Thereafter, films were sequentially stacked on the separation layer 22 using sputtering, namely, a $TiO_2$ film (thickness: 20 nm) as the transmittance adjustment film 421, an Ag—Pd—Cu film (thickness: 10 nm) as the metal film 422, a $ZrO_2$—$Cr_2O_3$ film (thickness: 11 nm) as the first dielectric film 424, a GeTe—$Sb_2Te_3$ film (thickness: 8 nm) as the recording film 426, a $ZrO_2$—$Cr_2O_3$ film (thickness: 5 nm) as the second interface film 427 (not shown), and a ZnS—$SiO_2$ film (thickness: 35 nm) as the second dielectric film 428.

Subsequently, an ultraviolet curable resin was applied on the second dielectric film 428 and a substrate with a guide groove (depth 20 nm, track pitch 0.32 µm) formed in its top was made to cover and stick to the resin and rotated. Accordingly, a uniform resin layer was formed. The substrate was peeled off after the resin was cured. As a result, an 18 µm thick separation layer 28, in whose third information layer 43 side a guide groove for guiding the laser beam 31 was formed, was obtained.

Thereafter, films were sequentially stacked on the separation layer 28 using sputtering, namely, a $TiO_2$ film (thickness: 18 nm) as the transmittance adjustment film 431, an Ag—Pd—Cu film (thickness: 8 nm) as the metal film 432, a $ZrO_2$—$Cr_2O_3$ film (thickness: 10 nm) as the first dielectric film 434, a GeTe—$Sb_2Te_3$ film (thickness: 7 nm) as the recording film 436, a $ZrO_2$—$Cr_2O_3$ film (thickness: 4 nm) as the second interface film 437 (not shown), and a ZnS—$SiO_2$ film (thickness: 33 nm) as the second dielectric film 438.

Finally, an ultraviolet curable resin was applied on the second dielectric film 438 and rotated and a uniform resin layer was formed. Thereafter, by curing the resin by way of irradiation with ultraviolet rays, a transparent layer 23 with a 57 µm thickness was formed. Subsequently, an initialization process to crystallize the recording film 416, the recording film 426 and the recording film 436 by means of a laser beam was carried out. The sample was thus fabricated.

For the sample accordingly obtained, the reflectance of each information layer was first measured, and the ratio between the reflectances of two different information layers was ascertained to be between 0.5 and 2.0.

That is, a thickness DN of the recording film with the Nth information layer which is closest to the light entry surface of the optical recording medium 11 is smaller than a thickness DM of the recording film of an Mth information layer (where M is an integer N>M≥1). Further, a reflectance RN from the Nth information layer is smaller than two times a reflectance RM from the Mth information layer.

For the sample, the symbol error rate (SER) of each information layer was subsequently measured using the optical recording/reproduction device in FIG. 1. Here, the recording was carried out by means of the recording method in which the capacity per side was 33.4 GB, and the shortest mark length (2T) was 0.112 µm. Further, the linear velocities of the sample at the time of recording and during measurement was 7.38 m/s. The reproduction power was switched by the information layer, and when the first information layer and the second information layer were reproduced, the reproduction power was set as 1.44 mW, and when the third information layer was reproduced, the reproduction power was set as 1.00 mW. The reproduction signal underwent PRML processing using PR (1, 2, 2, 2, 1). Further, the SER was measured for each of a state (DOW0) where recording had been performed only once after an unrecorded state and rewriting had not been performed and a state (DOW10) where recording had been performed 11 times after an unrecorded state and where rewriting had been performed 10 times. The SER was preferably no more than a reference value ($2.0 \times 10^{-4}$).

Here, the optical recording/reproduction device determines the position of the edge of the recording pulse by means of a trial write. At the time of a trial write, the optical recording/reproduction device first performs a trial write by using the parameters of a recording pulse which has already been recorded at the time of disc fabrication at the time of disc fabrication or after disc fabrication to an area called the lead-in area of the optical recording medium 11. Note that, if there are other optimal parameters, the optical recording/reproduction device may, for example, learn the position of the pulse edge and so on, and obtain the recording compensation table of a new edge variation amount to determine the pulse edge position.

In this embodiment, recording is performed according to the N/2 recording strategy recording compensation table shown in FIG. 8 and the power information shown in FIG. 9.

FIG. 14 is a drawing showing an example of a recording compensation table of a first information layer of the optical recording medium according to the embodiment of the present invention, FIG. 15 is a drawing showing an example of a recording compensation table of a second information layer of the optical recording medium according to the embodiment of the present invention, and FIG. 16 is a drawing showing an example of a pre-learning recording compensation table of a third layer of the optical recording medium according to the embodiment of the present invention. The control parameters in this embodiment were changed in Tw/32 units. As will be described subsequently, a recording reproduction characteristic for when the power ratio of the recording power is changed may be measured and the recording compensation table may be optimized according to the power ratio.

Here, the start position dTe of the erase power Pe of a 2T mark of the first information layer is set so that the cooling pulse is not retained. This is because, in a first information layer with a thick metal film, it is difficult to perform recording so that the shortest mark length (2T) is 0.112 μm because, when the recording pulse retains the cooling pulse, the mark is then too large. Note that a recording pulse for forming marks of 3T or more is set to retain the cooling pulse.

Table 9 is a table which shows an example of the recording power for recording information in the first information layer and the SER for a signal recorded with this recording power. The SER was measured for DOW0 and DOW10 respectively. Further, the determination in Table 9 is "possible" if the SER is no more than a reference value ($2.0 \times 10^{-4}$) and "not possible" if the SER exceeds the reference value ($2.0 \times 10^{-4}$).

TABLE 9

| | | Power setting | | SER | | Deter- |
|---|---|---|---|---|---|---|
| | | Set power (mW) | Ratio to Pw | DOW0 | DOW10 | mination |
| First information layer | Pw1 | 24.70 | 1.000 | 6.9E−05 | 8.9E−05 | Possible |
| | Pe1 | 10.87 | 0.440 | | | |
| | Pb1 | 0.12 | 0.005 | | | |
| | Pc1 | 0.12 | 0.005 | | | |

As shown in Table 9, it is clear that the recording reproduction characteristic of the first information layer is capable of largely fulfilling the reference.

Table 10 and Table 11 are tables which show an example of the recording power for recording information in the second information layer and the third information layer, and the SER of signals recorded using this recording power. In Tables 10 and 11, the results for the first information layer which are shown in Table 9 also appear for reference purposes. The SER was measured for the states DOW0 and DOW10 respectively. Further, the determination in Tables 10 and 11 is "possible" if the SER is no more than a reference value ($2.0 \times 10^{-4}$) and "not possible" if the SER exceeds the reference value ($2.0 \times 10^{-4}$). In addition, the overall determination is "possible" if all the determinations of each of the information layers are "possible" and "impossible" if just one is "impossible."

TABLE 10

| | | Power setting | | SER | | | Overall |
|---|---|---|---|---|---|---|---|
| | | Set power (mW) | Ratio to Pw | DOW0 | DOW10 | Determination | determination |
| First information layer | Pw1 | 24.70 | 1.000 | 6.9E−05 | 8.9E−05 | Possible | Impossible |
| | Pe1 | 10.87 | 0.440 | | | | |
| | Pb1 | 0.12 | 0.005 | | | | |
| | Pc1 | 0.12 | 0.005 | | | | |
| Second information layer | Pw2 | 21.00 | 1.000 | 2.6E−04 | 2.7E−04 | Impossible | |
| | Pe2 | 6.41 | 0.305 | | | | |
| | Pb2 | 3.35 | 0.160 | | | | |
| | Pc2 | 3.35 | 0.160 | | | | |
| Third information layer | Pw3 | 13.10 | 1.000 | 8.3E−05 | 3.6E−04 | Impossible | |
| | Pe3 | 4.00 | 0.305 | | | | |
| | Pb3 | 0.13 | 0.010 | | | | |
| | Pc3 | 0.13 | 0.010 | | | | |

TABLE 11

| | | Power setting | | SER | | | |
|---|---|---|---|---|---|---|---|
| | | Set power (mW) | Ratio to Pw | DOW0 | DOW10 | Determination | Overall determination |
| First information layer | Pw1 | 24.70 | 1.000 | 6.9E−05 | 8.9E−05 | Possible | Possible |
| | Pe1 | 10.87 | 0.440 | | | | |
| | Pb1 | 0.12 | 0.005 | | | | |
| | Pc1 | 0.12 | 0.005 | | | | |
| Second information layer | Pw2 | 21.00 | 1.000 | 1.5E−04 | 1.7E−04 | Possible | |
| | Pe2 | 6.41 | 0.305 | | | | |
| | Pb2 | 0.32 | 0.015 | | | | |
| | Pc2 | 0.32 | 0.015 | | | | |
| Third information layer | Pw3 | 13.10 | 1.000 | 8.5E−05 | 1.8E−04 | Possible | |
| | Pe3 | 4.00 | 0.305 | | | | |
| | Pb3 | 2.10 | 0.160 | | | | |
| | Pc3 | 0.13 | 0.010 | | | | |

First, if the recording power shown in Table 10 is set, the SER of the second information layer exceeds the reference value for both the state DOW0 and also the state DOW10. Meanwhile, if the recording power shown in Table 11 is set, the SER of the second information layer fulfills the reference value for both the state DOW0 and also the state DOW10. That is, in the case of the recording power shown in Table 11, because the bottom power Pb2 of the second information layer is high, the temperature change during recording is rapid cooling, and mark portions which are noncrystalline phases are readily formed. Hence, even in the second information layer, in which the ratio between the reflectance of the recording film which is a crystalline phase and the reflectance of the recording film which is a noncrystalline phase tends to be small as a result of setting the reflectance high, it is possible to set a large signal amplitude and improve the reproduction signal quality.

If the recording power shown in Table 10 is set subsequently, the SER of the third information layer does not exceed the reference value in the state DOW0 and exceeds the reference value in the state DOW10. Meanwhile, if the recording power shown in Table 11 is set, the SER of the third information layer fulfills the reference value for both the state DOW0 and also the state DOW10. In other words, in the case of the recording power shown in Table 11, because the bottom power Pb3 of the third information layer is high, the temperature change during writing is slow cooling, and mark portions which are noncrystalline phases are formed small, thereby yielding an effect whereby rewriting is straightforward. Hence, even in the case of the third information layer for which erasure performance readily suffers when the thickness of the recording film is thin in order to raise the transmittance, it is possible to secure the erasure performance actually required and improve the reproduction signal quality.

Figure 17:
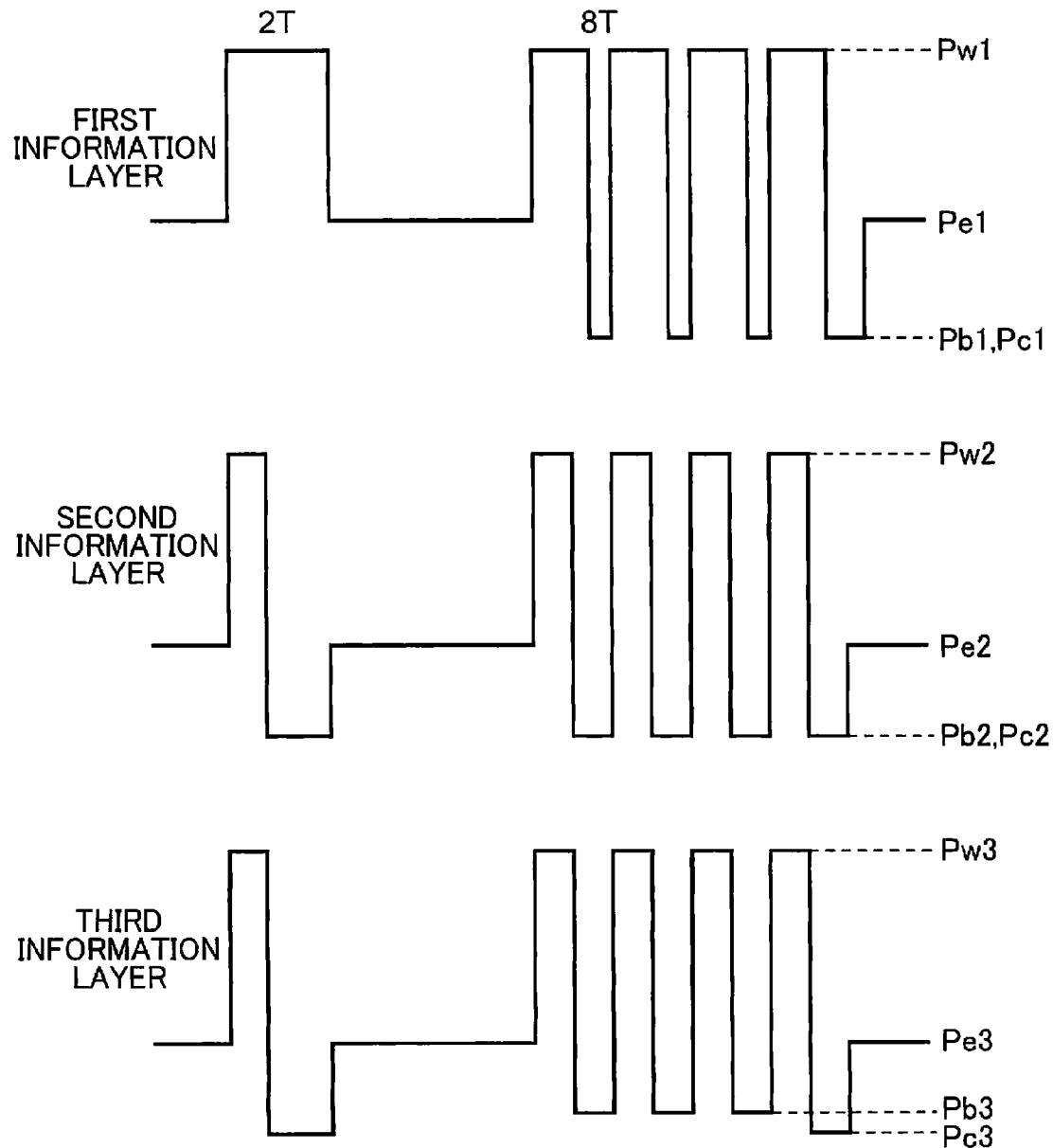
FIG. 17 is a drawing showing examples of recording pulse trains of each information layer according to this embodiment.

FIG. 17 is a drawing showing an example of the recording pulse train of each information layer according to this embodiment. FIG. 17 represents the respective recording pulse trains for each of the first to third information layers.

The powers shown in FIG. 17 are preferably each set as per Table 11. That is, the peak power Pw3 of the third information layer, the bottom power Pb3 of the third information layer, the peak power Pw2 of the second information layer, and the bottom power Pb2 of the second information layer satisfy the following formula:

$Pb3/Pw3 > Pb2/Pw2$.

That is, the peak power PwN of the Nth information layer closest to the light entry surface of the optical recording medium, the bottom power PbN of the Nth information layer, the peak power PwM of the Mth information layer (where M is an integer N>M≥1), and the bottom power PbM of the Mth information layer satisfy the following formula:

$PbN/PwN > PbM/PwM$.

Further, the bottom power Pb3 of the third information layer is greater than the cooling power Pc3 of the third information layer, and the bottom power Pb2 of the second information layer is equal to the cooling power Pc2 of the second information layer.

That is, the bottom power PbN of the Nth information layer is greater than the cooling power PcN of the Nth information layer, and the bottom power PbM of the Mth information layer is equal to the cooling power PcM of the Mth information layer.

Further, the bottom power Pb1 of the first information layer farthest from the light entry surface of the optical recording medium is equal to the cooling power Pc1 of the first information layer.

In addition, if the shortest recording mark (2T mark) is formed on the recording film of the first information layer, a recording pulse train which does not contain a cooling pulse is generated.

Note that, although only the bottom power Pb is set high in the example of Table 11, the result of making rewriting straightforward can be obtained even when the cooling power Pc has been set high. In an N/2 recording strategy, by setting the cooling power Pc low, the temperature change when recording the shortest mark (2T) is rapid cooling. Hence, the shortest mark is readily formed and signal quality improves. Here, even when the shortest mark is large, the effect on the rewrite performance in comparison with long marks is small. Hence, with the N/2 recording strategy, making the bottom power Pb3 of the third information layer greater than the cooling power Pc3 is effective.

According to Table 11, by making the ratio of the bottom power Pb3 to the peak power Pw3 of the third information layer greater than the ratio of the bottom power Pb2 to the peak power Pw2 of the second information layer, it can be seen that it is possible to establish a high quality for the recording and reproduction of information in all the information layers.

Further, Table 12 is a table which shows an example of the recording power for recording information in the second information layer and the third information layer and shows the SER of a signal recorded with a recording power for which the ratio of the bottom power to the peak power is 0.100 for both the second information layer and also the third information layer. The determination method is the same as for Table 10 and Table 11.

TABLE 12

| | | Power setting | | SER | | | Overall |
|---|---|---|---|---|---|---|---|
| | | Set power (mW) | Ratio to Pw | DOW0 | DOW10 | Determination | determination |
| First information layer | Pw1 | 24.70 | 1.000 | 6.9E−05 | 8.9E−05 | Possible | Impossible |
| | Pe1 | 10.87 | 0.440 | | | | |
| | Pb1 | 0.12 | 0.005 | | | | |
| | Pc1 | 0.12 | 0.005 | | | | |
| Second information layer | Pw2 | 21.00 | 1.000 | 2.4E−04 | 2.5E−04 | Impossible | |
| | Pe2 | 6.41 | 0.305 | | | | |
| | Pb2 | 2.10 | 0.100 | | | | |
| | Pc2 | 2.10 | 0.100 | | | | |
| Third information layer | Pw3 | 13.10 | 1.000 | 8.1E−05 | 2.6E−04 | Impossible | |
| | Pe3 | 4.00 | 0.305 | | | | |
| | Pb3 | 1.31 | 0.010 | | | | |
| | Pc3 | 0.13 | 0.010 | | | | |

According to Table 12, if, for the second information layer and the third information layer, the ratio of the bottom power to the peak power is 0.100, a favorable recording/reproduction characteristic is not obtained. In other words, the ratio of the bottom power to the peak power in the second information layer must be smaller than 0.100 and the ratio of the bottom power to the peak power in the third information layer must be greater than 0.100.

On that basis, it is clear that it is necessary to set the ratio of the bottom power Pb3 to the peak power Pw3 of the third information layer greater than the ratio of the bottom power Pb2 to the peak power Pw2 of the second information layer in order to afford high quality recording and reproduction of information in all the information layers.

Note that, in this embodiment, the N/2 recording strategy is employed which involves a recording pulse characterized in that, when the recorded mark length increases by two, the number of pulses increases by one, but a recording pulse may also be used such that when the recorded mark length increases by one, the number of pulses increases by one.

Note that, in this embodiment, the optical recording medium comprises three information layers, namely the first information layer, the second information layer, and the third information layer, but a result similar to this embodiment is obtained even in the case of an optical recording medium comprising four information layers.

Figure 18:
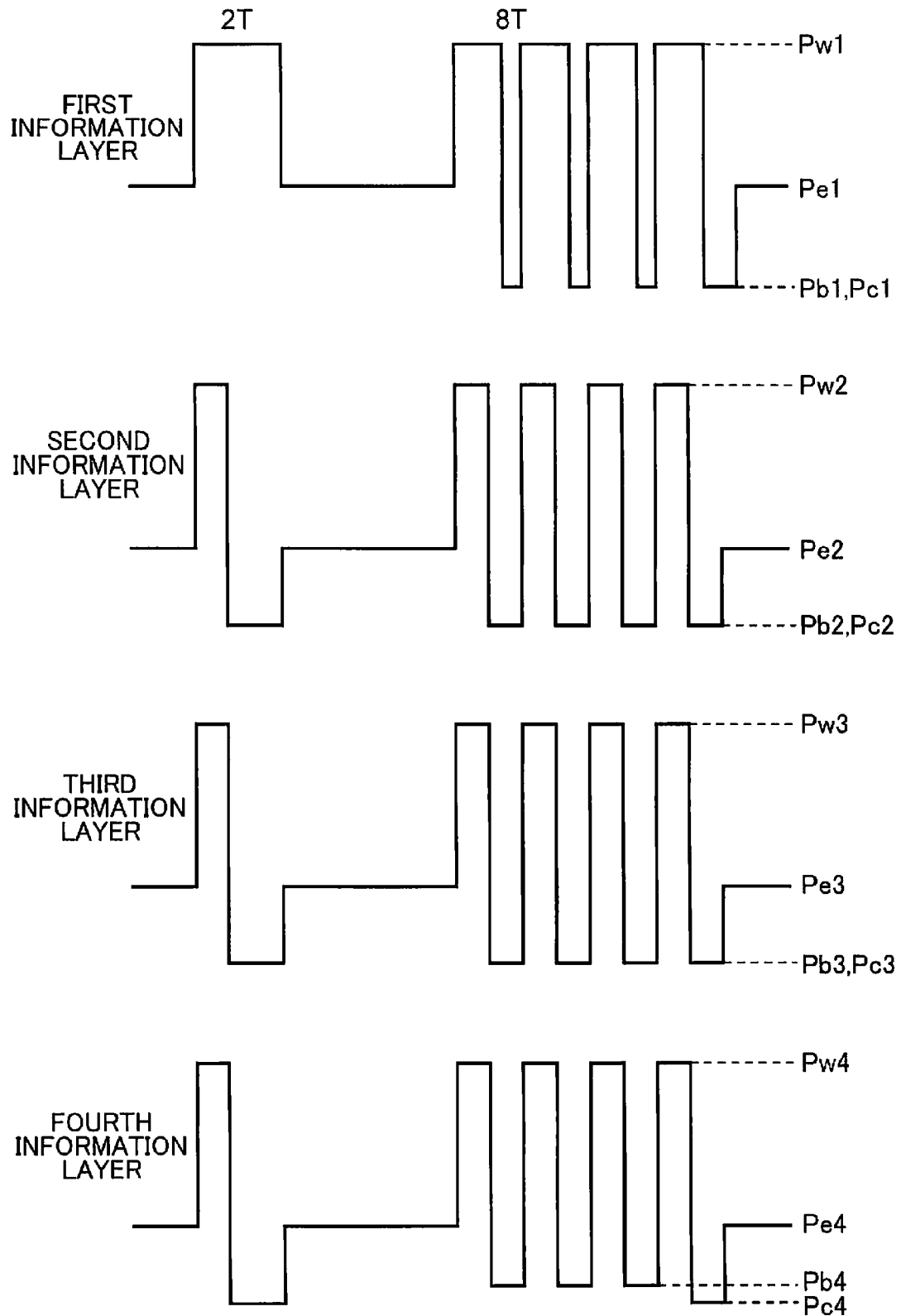
FIG. 18 is a drawing showing examples of recording pulse trains of each information layer according to a first modified example of this embodiment.

FIG. 18 is a drawing showing examples of recording pulse trains of each information layer according to a first modified example of this embodiment The optical recording medium according to a first modified example of this embodiment comprises four information layers. FIG. 18 shows the respective recording pulse trains of the first to fourth information layers. As shown in FIG. 18, in the first modified example of this embodiment, the recording pulse train of the second information layer and the recording pulse train of the third information layer are the same.

Furthermore, the recording pulse train of the first information layer in the first modified example and the recording pulse train of the first information layer shown in FIG. 17 are the same, the recording pulse trains of the second information layer and third information layer of the first modified example are the same as the recording pulse train of the second information layer shown in FIG. 17, and the recording pulse train of the fourth information layer according to the first modified example is the same as the recording pulse train of the third information layer shown in FIG. 17.

As shown in FIG. 18, the peak power Pw4 of the fourth information layer, the bottom power Pb4 of the fourth information layer, the peak power Pw3 of the third information layer, and the bottom power Pb3 of the third information layer satisfy the following formula:

$$Pb4/Pw4 > Pb3/Pw3.$$

Further, Pb3/Pw3 is equal to Pb2/Pw2.

Figure 19:
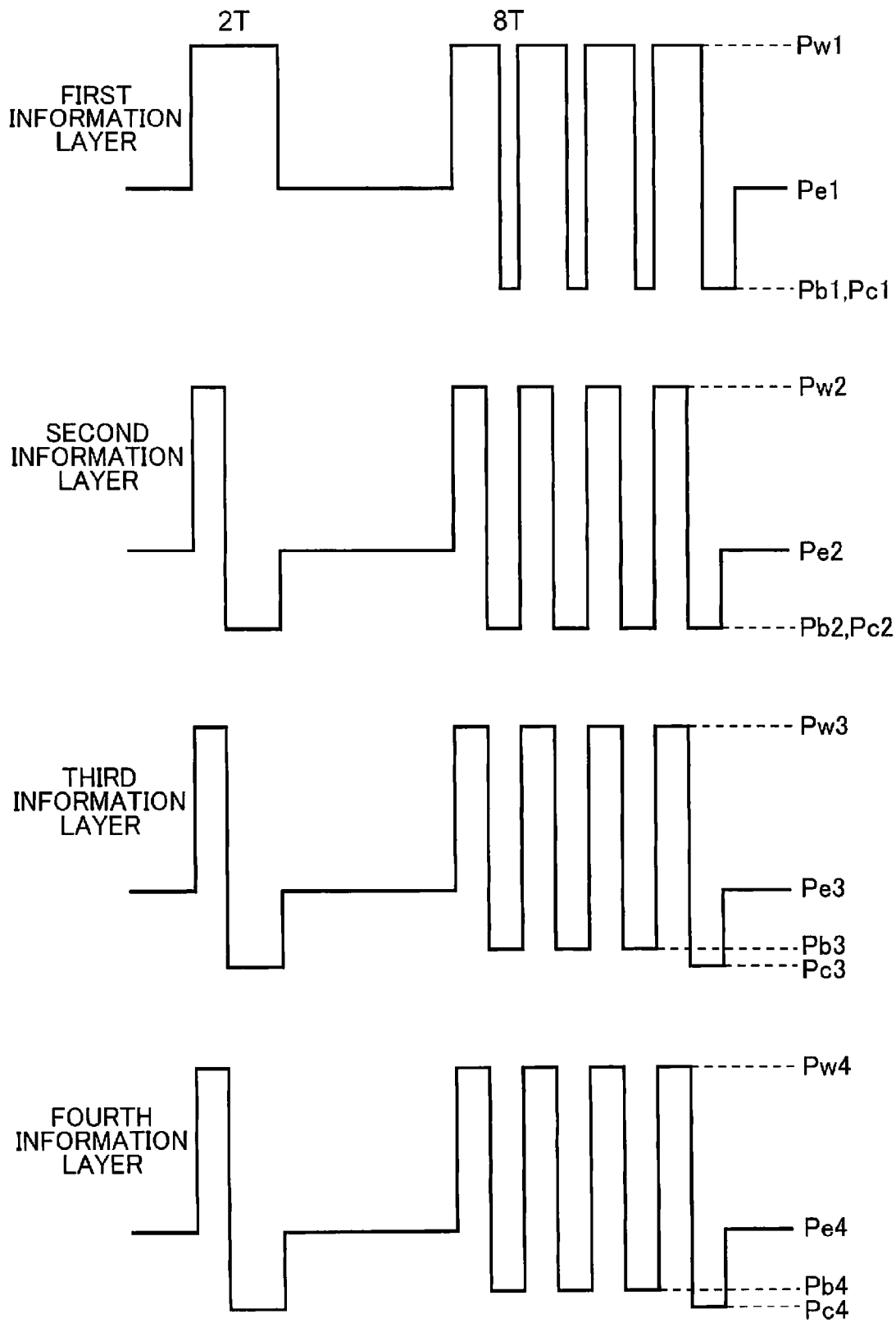
FIG. 19 is a drawing showing examples of recording pulse trains of each information layer according to a second modified example of this embodiment.

FIG. 19 is a drawing showing an example of recording pulse trains of each information layer according to a second modified example of this embodiment. The optical recording medium according to the second modified example of this embodiment comprises four information layers. FIG. 19 shows the respective recording pulse trains of the first to fourth information layers. As shown in FIG. 19, in the second modified example according to this embodiment, the recording pulse train of the third information layer and the recording pulse train of the fourth information layer are the same.

Further, the recording pulse train of the first information layer according to the second modified example and the recording pulse train of the first information layer shown in FIG. 17 are the same, the recording pulse train of the second information layer according to the second modified example and the recording pulse train of the second information layer shown in FIG. 17 are the same, and the recording pulse trains of the third information layer and fourth information layer according to the second modified example are the same as the recording pulse train of the third information layer shown in FIG. 17.

As shown in FIG. 19, the peak power Pw4 of the fourth information layer, the bottom power Pb4 of the fourth information layer, the peak power Pw2 of the second information layer, and the bottom power Pb2 of the second information layer satisfy the following formula:

$$Pb4/Pw4 > Pb2/Pw2.$$

Further, the Pb4/Pw4 is equal to Pb3/Pw3.

Note that, in the second modified example shown in FIG. 19, the bottom power Pb3 of the third information layer and the bottom power Pb4 of the fourth information layer are the same, but the present invention is not limited to this arrangement in particular, rather, the bottom power Pb3 of the third information layer may also be smaller than the bottom power Pb4 of the fourth information layer. That is, the bottom power Pw4 of the fourth information layer, the bottom power Pb4 of the fourth information layer, the peak power Pw3 of the third information layer, the bottom power Pb3 of the third information layer, the peak power Pw2 of the second information layer, and the bottom power Pb2 of the second information layer may satisfy the following formula:

$$Pb4/Pw4 > Pb3/Pw3 > Pb2/Pw2.$$

Further, the same effect as this example may be obtained even with an optical recording medium which comprises two information layers.

Figure 20:
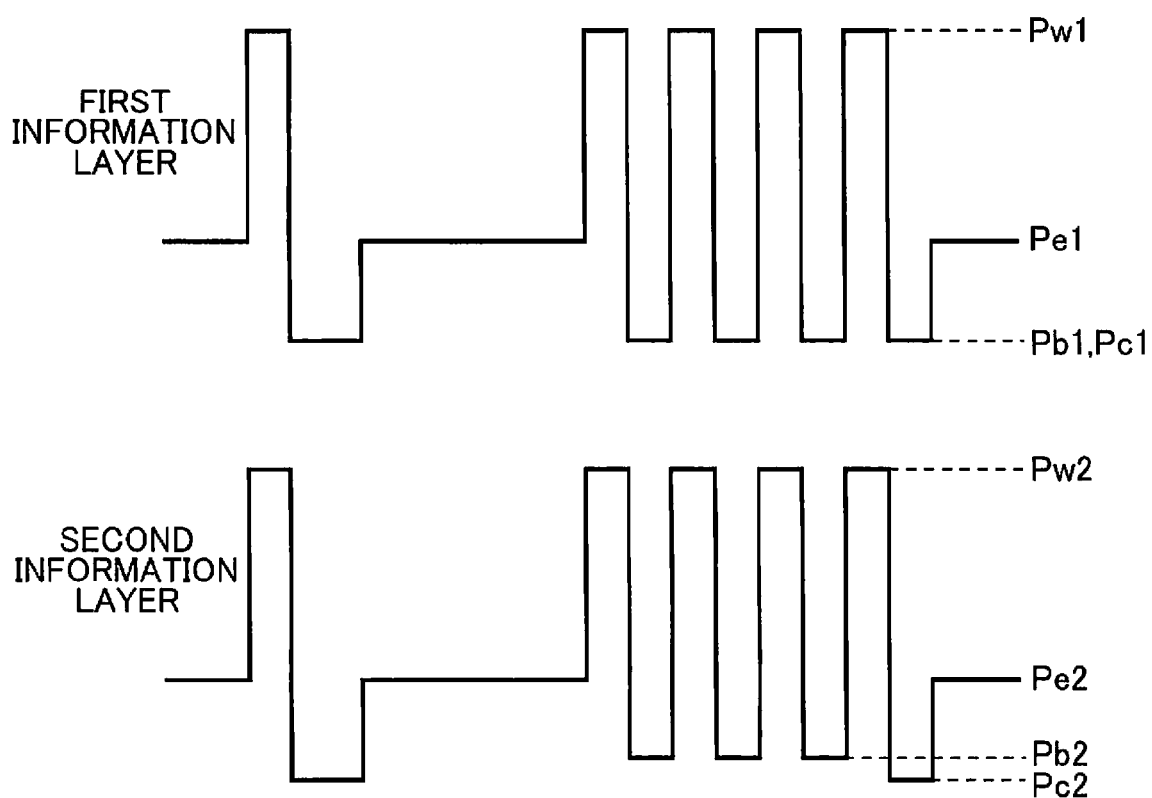
FIG. 20 is a drawing showing examples of recording pulse trains of each information layer according to a third modified example of this embodiment.

FIG. 20 is a drawing showing examples of recording pulse trains of each information layer according to a third modified example of this embodiment. The optical recording medium according to the third modified example of this embodiment comprises two information layers. FIG. 20 shows the respective recording pulse trains of the first and second information layers. As shown in FIG. 20, the recording pulse train of the first information layer according to the third modified example and the recording pulse train of the second information layer shown in FIG. 17 are the same, and the recording pulse train of the second information layer according to the third modified example and the recording pulse train of the third information layer shown in FIG. 17 are the same.

As shown in FIG. 20, the peak power Pw2 of the second information layer, the bottom power Pb2 of the second information layer, the peak power Pw1 of the first information layer, and the bottom power Pb1 of the first information layer satisfy the following formula:

$$Pb2/Pw2 > Pb1/Pw1.$$

Thus, the optical recording medium comprises N (where N is an integer or two or more) information layers. Further, the N information layers each comprise a recording film in which a change in physical state is generated as a result of a localized temperature change brought about by focusing a laser beam. Further, recording marks are formed in the recording film as a result of being irradiated with a laser beam which corresponds to a recording pulse train.

Figure 21:
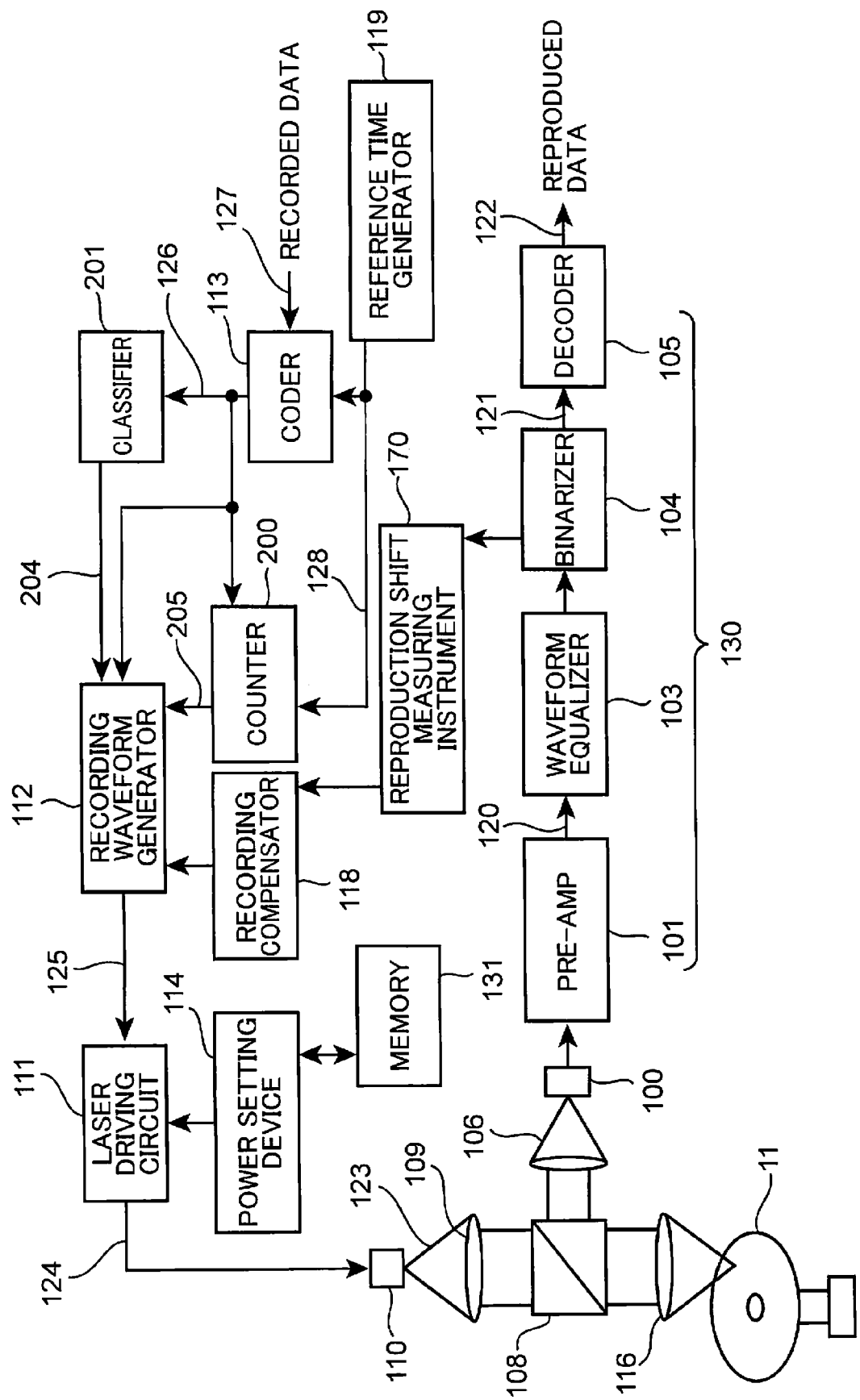
FIG. 21 is a block diagram showing a configuration of an optical recording/reproduction device according to a fourth modified example of this embodiment.

In addition, the power setting device 114 reads power information from the optical recording medium 11 according to this embodiment, but the present invention is not limited to such an arrangement, rather, the power setting device 114 may also read power information from memory. FIG. 21 is a block diagram showing the configuration of an optical recording/reproduction device according to a fourth modified example of this embodiment. Note that, in FIG. 21, the same reference numerals are assigned to the same configuration as FIG. 1 and a description thereof is omitted.

The memory 131 pre-stores peak power which represents the power of the write pulse in each information layer and bottom power which represents the power of the bottom pulse in each information layer. Note that the memory 131 stores not only the peak power and bottom power but also cooling power and erase power. The memory 131 stores the peak power, bottom power, cooling power, and erase power as power information.

The power information which is stored in the memory 131 may be pre-stored during fabrication of the optical recording/reproduction device. The power information which is stored in the memory 131 may also store power information which is read from the optical recording medium by the reading unit 130 in association with identification information for identifying the optical recording medium. Note that the memory 131 corresponds to an example of a storage unit in this embodiment.

The power setting device 114 sets the power of each pulse in the recording pulse train on the basis of the peak power of each information layer and the bottom power of each information layer which are stored in the memory 131.

Note that the materials and film thicknesses cited in the above embodiment and examples are examples of various materials and film thicknesses for realizing the present invention and the present invention is not limited to these examples. The optical information recording medium according to the present invention may employ materials other than the materials cited in the above embodiment and examples and may be configured with thicknesses other than the thicknesses of each layer thus cited in the above embodiment and examples.

Note that inventions with the following configurations are mainly incorporated in the foregoing specific embodiments.

The optical information recording device according to an aspect of the present invention is an optical information recording device which records information on an optical information recording medium including N (where N is an integer of two or more) information layers, the N information layers each having a recording film of which a physical state changes as a result of a localized temperature change brought about by focusing a laser beam, the optical information recording device including: a light source which emits the laser beam; a recording pulse train generation unit which generates a recording pulse train for forming a recording mark on the recording film; a power setting unit which sets a power of each pulse in the recording pulse train; and a driving unit which drives the light source to emit the laser beam corresponding to the recording pulse train generated by the recording pulse train generation unit with the power set by the power setting unit, wherein the recording pulse train includes at least one write pulse having a highest power, a bottom pulse which is formed, when there is a plurality of write pulses, between the write pulses, and a cooling pulse which is formed subsequent to a last write pulse, and when a power of the write pulse is taken as a peak power and a power of the bottom pulse is taken as a bottom power, the power setting unit sets the power of each pulse in the recording pulse train such that a peak power PwN of an Nth information layer which is closest to a light entry surface of the optical information recording medium, a bottom power PbN of the Nth information layer, a peak power PwM of an Mth information layer (where M is an integer such that N>M≥1), and a bottom power PbM of the Mth information layer satisfy the following formula:

$$PbN/PwN > PbM/PwM.$$

With this configuration, the light source emits a laser beam. The recording pulse train generation unit generates a recording pulse train for forming recording marks on the recording film. The power setting unit sets the power of each pulse in the recording pulse train. The driving unit drives the light source such that the laser beam, which corresponds to the recording pulse train generated by the recording pulse train generation unit, is emitted with the power set by the power setting unit. The recording pulse train includes at least one write pulse with the highest power, a bottom pulse which is formed between a plurality of write pulses if there are a plurality of write pulses, and a cooling pulse which is formed subsequent to the last write pulse. When the power of the write pulse is taken as the peak power and the power of the bottom pulse is taken as the bottom power, the power setting unit sets the power of each pulse in the recording pulse train such that the peak power PwN of the Nth information layer closest to the light entry surface of the optical information recording medium, the bottom power PbN of the Nth information layer, the peak power PwM of the Mth information layer (where M is an integer N>M≥1) and the bottom power PbM of the Mth information layer satisfy the above formula.

Therefore, because the power of each pulse in the recording pulse train is set such that the ratio of the bottom power PbN to the peak power PwN of the Nth information layer closest to the light entry surface of the optical information recording medium among the N information layers is higher than the ratio of the bottom power PbM to the peak power PwM of the Mth information layer (where M is an integer N>M≥1), the temperature change during recording of the Mth information layer is relatively rapid cooling, and recording marks which are noncrystalline phases can be easily formed. Hence, even in the Mth information layer, in which the ratio between the reflectance of the recording film which is a crystalline phase and the reflectance of the recording film which is a noncrystalline phase tends to be small as a result of raising the reflectance, the signal amplitude can be increased and the reproduction signal quality can be improved.

Furthermore, the temperature change during recording in the Nth information layer is relatively slow cooling and recording marks which are noncrystalline phases are formed smaller, and therefore rewriting of information is straightforward. Hence, even in the case of an Nth information layer with which the thickness of the recording film is thin in order to raise the transmittance and the erasure performance readily suffers, it is possible to ensure the erasure performance that is actually required.

Thus, in an optical recording medium which includes two or more information layers, high quality information can be recorded in all the information layers.

Further, where the recording pulse train in the above optical information recording device is concerned, the power setting unit preferably sets the power of each pulse in the recording pulse train such that, when a power of the cooling pulse is taken as a cooling power, the bottom power PbN of the Nth information layer is larger than a cooling power PcN of the Nth information layer and the bottom power PbM of the Mth information layer is equal to a cooling power PcM of the Mth information layer.

With this configuration, when the power of the cooling pulse is taken as the cooling power, the power setting unit sets the power of each pulse in the recording pulse train such that the bottom power PbN of the Nth information layer is greater than the cooling power PcN of the Nth information layer and the bottom power PbM of the Mth information layer is equal to the cooling power PcM of the Mth information layer.

Therefore, the temperature change at the time of recording the shortest mark can be set as rapid cooling by making the bottom power PbN of the Nth information layer greater than the cooling power PcN of the Nth information layer. Hence, the shortest mark is readily formed and the signal quality can be improved.

In addition, because the bottom power PbM of the Mth information layer is equal to the cooling power PcM of the Mth information layer, it is possible to modulate the laser beam at power levels of three values, namely, peak power, bottom power, and erase power which is the power of the erase pulse.

Furthermore, in the above optical information recording device, the optical information recording medium preferably includes three or more information layers; when the power of the cooling pulse is taken as the cooling power, the power setting unit preferably sets the power of each pulse in the recording pulse train such that a bottom power Pb1 of a first information layer which is farthest from the light entry surface of the optical information recording medium is equal to a cooling power Pc1 of the first information layer; and when a shortest recording mark is formed on the recording film of the first information layer, the recording pulse train generation unit preferably generates a recording pulse train which does not include the cooling pulse.

According to this configuration, the optical information recording medium includes information layers of three or more layers. When the power of the cooling pulse is taken as the cooling power, the power setting unit sets the power of each pulse in the recording pulse train such that the bottom power Pb1 of the first information layer farthest from the light entry surface of the optical information recording medium is equal to the cooling power Pc1 of the first information layer. The recording pulse train generation unit generates a recording pulse train which does not include a cooling pulse if the shortest recording mark is formed on the recording film of the first information layer.

Therefore, if the shortest recording mark is formed on the recording film of the first information layer, because a recording pulse train which does not include the cooling pulse is then generated, the recording mark can be made small in the first information layer with a thick metal film.

Further, in the above optical information recording device, the N information layers preferably include only three information layers.

According to this configuration, in an optical information recording medium which includes only three information layers, the signal amplitude of the first and second information layers can be set large, the reproduction signal quality can be improved, and the erase performance which is actually required for the third information layer can be ensured.

Further, in the above optical information recording device, the optical information recording medium preferably records a peak power representing the power of the write pulse of each information layer, and a bottom power representing the power of the bottom pulse of each information layer, the optical information recording device preferably further includes a reading unit which reads the peak power of each information layer and the bottom power of each information layer from the optical information recording medium, wherein the power setting unit preferably sets the power of each pulse in the recording pulse train on the basis of the peak power of each information layer and the bottom power of each information layer read by the reading unit.

According to this configuration, the optical information recording medium records peak power, which represents the power of the write pulse of each information layer, and bottom power, which represents the power of the bottom pulse of each information layer. The reading unit reads the peak power of each information layer and the bottom power of each information layer from the optical information recording medium. Further, the power setting unit sets the power of each pulse in the recording pulse train on the basis of the peak power of each information layer and the bottom power of each information layer thus read by the reading unit.

Hence, the power of each pulse in the recording pulse train can be set on the basis of the peak power of each information layer and the bottom power of each information layer thus read from the optical information recording medium.

Furthermore, the above optical information recording device preferably further includes a storage unit which pre-stores a peak power representing the power of the write pulse of each information layer and a bottom power representing the power of the bottom pulse of each information layer, wherein the power setting unit preferably sets the power of each pulse in the recording pulse train on the basis of the peak power of each information layer and the bottom power of each information layer stored in the storage unit.

According to this configuration, the storage unit pre-stores the peak power, which represents the power of the write pulse in each information layer, and the bottom power, which represents the power of the bottom pulse in each information layer. The power setting unit sets the power of each pulse in the recording pulse train on the basis of the peak power of each information layer and the bottom power of each information layer which are stored in the storage unit.

Therefore, the power of each pulse in the recording pulse train can be set on the basis of the peak power of each information layer and the bottom power of each information layer thus read from the storage unit.

The optical information recording method according to another aspect of the present invention is an optical information recording method which records information on an optical information recording medium including N (where N is an integer of two or more) information layers, the N information layers each having a recording film of which a physical state changes as a result of a localized temperature change brought about by focusing a laser beam, the optical information recording method including: a recording pulse train generation step of generating a recording pulse train for forming a recording mark on the recording film; a power setting step of setting a power of each pulse in the recording pulse train; a driving step of driving a light source to emit the laser beam corresponding to the recording pulse train generated in the recording pulse train generation step with the power set in the power setting step; and a laser beam emission step of emitting the laser beam from the light source, wherein the recording pulse train includes at least one write pulse having a highest power, a bottom pulse which is formed, when there is a plurality of write pulses, between the write pulses, and a cooling pulse which is formed subsequent to a last write pulse, and when a power of the write pulse is taken as a peak power and a power of the bottom pulse is taken as a bottom power, the power of each pulse in the recording pulse train is set in the power setting step such that a peak power PwN of an Nth information layer which is closest to a light entry surface of the optical information recording medium, a bottom power PbN of the Nth information layer, a peak power PwM of an Mth information layer (where M is an integer such that N>M≥1) and a bottom power PbM of the Mth information layer satisfies the following formula:

$PbN/PwN > PbM/PwM.$

According to this configuration, in the recording pulse train generation step, a recording pulse train for forming recording marks on the recording film is generated. Subsequently, in the power setting step, the power of each pulse in the recording pulse train is set. Thereafter, in the driving step, the light source is driven to emit a laser beam, which corresponds to the recording pulse train generated in the recording pulse train generation step, with the power set in the power setting step. Subsequently, in the laser beam emission step, a laser beam is emitted from the light source. The recording pulse train includes at least one write pulse which possesses the highest power, a bottom pulse which is formed between a plurality of write pulses if there are a plurality of write pulses, and a cooling pulse which is formed subsequent to the last write pulse. When the power of the write pulse is taken as the peak power and the power of the bottom pulse is taken as the bottom power, the power of each pulse in the recording pulse train is set in the power setting step such that the peak power PwN of the Nth information layer which is closest to the light entry surface of the optical information recording medium, the bottom power PbN of the Nth information layer, the peak power PwM of the Mth information layer (where M is an integer N>M≥1) and the bottom power PbM of the Mth information layer satisfy the formula below.

Therefore, because the power of each pulse in the recording pulse train is set such that the ratio of the bottom power PbN to the peak power PwN of the Nth information layer which is closest to the light entry surface of the optical information recording medium among the N information layers is higher than the ratio of the bottom power PbM to the peak power PwM of the Mth information layer (where M is an integer N>M≥1), the temperature change during recording in the Mth information layer is relatively rapid cooling, and the recording mark which is a noncrystalline phase can be easily formed. Hence, even in the case of an Mth information layer in which the ratio between the reflectance of the recording film which is a crystalline phase and the reflectance of the recording film which is a noncrystalline phase tends to be small as a result of setting the reflectance high, it is possible to set a large signal amplitude and improve the reproduction signal quality.

Further, because the temperature change during recording of the Nth information layer is relatively slow cooling and the recording marks which are noncrystalline phases are formed smaller, rewriting of information is straightforward. Hence, even in the Nth information layer for which the thickness of the recording film is small in order to increase the transmittance and the erasure performance readily suffers, the erasure performance which is actually required can be ensured.

Thus, in the case of an optical recording medium which includes two or more information layers, high quality information can be recorded on all information layers.

The optical information recording medium according to another aspect of the present invention includes N (where N is an integer of two or more) information layers, wherein the N information layers each have a recording film of which a physical state changes as a result of a localized temperature change brought about by focusing a laser beam, a recording mark is formed on the recording film as a result of being irradiated with a laser beam corresponding to a recording pulse train, a thickness DN of the recording film of an Nth information layer which is closest to a light entry surface of the optical information recording medium is smaller than a thickness DM of the recording film of an Mth information layer (where M is an integer such that N>M≥1), a reflectance RN from the Nth information layer is smaller than two times a reflectance RM from the Mth information layer, the recording pulse train includes at least one write pulse having a highest power, a bottom pulse which is formed, when there is a plurality of write pulses, between the write pulses, and a cooling pulse which is formed subsequent to a last write pulse, at least one information layer among the N information layers records a peak power representing a power of the write pulse of each information layer and a bottom power representing a power of the bottom pulse of each information layer, and a peak power PwN of the Nth information layer, a bottom power PbN of the Nth information layer, a peak power PwM of the Mth information layer, and a bottom power PbM of the Mth information layer satisfy the following formula:

$PbN/PwN > PbM/PwM.$

According to this configuration, the thickness DN of the recording film of an Nth information layer closest to the light entry surface of the optical information recording medium is smaller than the thickness DM of the recording film of an Mth information layer (where M is an integer N>M≥1). Further, the reflectance RN from the Nth information layer is less than two times the reflectance RM from the Mth information layer. The recording pulse train includes at least one write pulse which possesses the highest power, a bottom pulse which is formed between a plurality of write pulses if there are a plurality of write pulses, and a cooling pulse which is formed subsequent to the last write pulse. At least one information layer among the N information layers records peak power, which represents the power of the write pulse of each information layer, and bottom power, which represents the power of the bottom pulse of each information layer. Further, the peak power PwN of the Nth information layer, the bottom power PbN of the Nth information layer, the peak power PwM of the Mth information layer, and the bottom power PbM of the Mth information layer satisfy the formula above.

Therefore, the ratio of the bottom power PbN to the peak power PwM of the Nth information layer closest to the light entry surface of the optical information recording medium among the N information layers is higher than the ratio of the bottom power PbM to the peak power PwM of the Mth information layer (where M is an integer N>M≥1) and therefore the temperature change during recording of the Mth information layer is relatively rapid cooling, and recording marks which are noncrystalline phases can easily be formed. For this reason, even in the case of the Mth information layer in which the ratio between the reflectance of the recording film which is a crystalline phase and the reflectance of the recording film which is a noncrystalline phase tends to be small as a result of setting the reflectance high, it is possible to set a large signal amplitude and improve the reproduction signal quality.

Further, because the temperature change during recording of the Nth information layer is relatively slow cooling and the recording marks which are noncrystalline phases are formed smaller, rewriting of information is straightforward. Hence, even in the case of the Nth information layer for which the thickness of the recording film is small in order to increase the transmittance and the erasure performance readily suffers, the erasure performance which is actually required can be ensured.

Thus, in the case of an optical recording medium which includes two or more information layers, high quality information can be recorded on all information layers.

Note that the specific embodiments and examples described in the section of Description of Embodiments are first and foremost for clarifying the technical contents of the present invention, and the present invention should not be narrowly interpreted as being limited to such specific examples, and the present invention may be variously modified and implemented within the scope of the spirit and claims of the present invention.

INDUSTRIAL APPLICABILITY

The optical information recording device, optical information recording method, and optical information recording medium according to the present invention are useful for an optical information recording device, an optical information recording method, and an optical information recording medium including two or more information layers, which are capable of recording high quality information in all information layers in an information recording medium which includes two or more information layers, and in which information is recorded in the optical information recording medium by irradiating a laser beam.

The invention claimed is:

1. An optical information recording device which records information on an optical information recording medium including N (where N is an integer of two or more) information layers,
    the N information layers each having a recording film of which a physical state changes as a result of a localized temperature change brought about by focusing a laser beam,
    the optical information recording device comprising:
    a light source which emits the laser beam;
    a recording pulse train generation unit which generates a recording pulse train for forming a recording mark on the recording film;
    a power setting unit which sets a power of each pulse in the recording pulse train; and
    a driving unit which drives the light source to emit the laser beam corresponding to the recording pulse train generated by the recording pulse train generation unit with the power set by the power setting unit,
    wherein a thickness DN of the recording film of an Nth information layer which is closest to a light entry surface of the optical information recording medium is smaller than a thickness DM of the recording film of an Mth information layer (where M is an integer such that N>M≥1),
    a reflectance RN from the Nth information layer is smaller than two times a reflectance RM from the Mth information layer,
    the recording pulse train includes at least one write pulse having a highest power, a bottom pulse which is formed, when there is a plurality of write pulses, between the write pulses, and a cooling pulse which is formed subsequent to a last write pulse, and
    when a power of the write pulse is taken as a peak power and a power of the bottom pulse is taken as a bottom power,
    the power setting unit sets the power of each pulse in the recording pulse train such that a peak power PwN of the Nth information layer, a bottom power PbN of the Nth information layer, a peak power PwM of the Mth information layer, and a bottom power PbM of the Mth information layer satisfy the following formula:

$$PbN/PwN > PbM/PwM.$$

2. The optical information recording device according to claim 1,
    wherein, when a power of the cooling pulse is taken as a cooling power, the power setting unit sets the power of each pulse in the recording pulse train such that the bottom power PbN of the Nth information layer is higher than a cooling power PcN of the Nth information layer, and the bottom power PbM of the Mth information layer is equal to a cooling power PcM of the Mth information layer.

3. The optical information recording device according to claim 1,
    wherein the optical information recording medium includes three or more information layers,
    when the power of the cooling pulse is taken as the cooling power,
    the power setting unit sets the power of each pulse in the recording pulse train such that a bottom power Pb1 of a first information layer which is farthest from the light entry surface of the optical information recording medium is equal to a cooling power Pc1 of the first information layer, and
    when a shortest recording mark is formed on the recording film of the first information layer, the recording pulse train generation unit generates a recording pulse train which does not include the cooling pulse.

4. The optical information recording device according to claim 1,
wherein the N information layers include only three information layers.

5. The optical information recording device according to claim 1,
wherein the optical information recording medium records a peak power representing the power of the write pulse of each information layer, and a bottom power representing the power of the bottom pulse of each information layer,
the optical information recording device further comprises
a reading unit which reads the peak power of each information layer and the bottom power of each information layer from the optical information recording medium,
wherein the power setting unit sets the power of each pulse in the recording pulse train on the basis of the peak power of each information layer and the bottom power of each information layer read by the reading unit.

6. The optical information recording device according to claim 1, further comprising
a storage unit which pre-stores a peak power representing the power of the write pulse of each information layer and a bottom power representing the power of the bottom pulse of each information layer,
wherein the power setting unit sets the power of each pulse in the recording pulse train on the basis of the peak power of each information layer and the bottom power of each information layer stored in the storage unit.

7. An optical information recording method which records information on an optical information recording medium including N (where N is an integer of two or more) information layers,
the N information layers each having a recording film of which a physical state changes as a result of a localized temperature change brought about by focusing a laser beam,
the optical information recording method comprising:
a recording pulse train generation step of generating a recording pulse train for forming a recording mark on the recording film;
a power setting step of setting a power of each pulse in the recording pulse train;
a driving step of driving a light source to emit the laser beam corresponding to the recording pulse train generated in the recording pulse train generation step with the power set in the power setting step; and
a laser beam emission step of emitting the laser beam from the light source,
wherein a thickness DN of the recording film of an Nth information layer which is closest to a light entry surface of the optical information recording medium is smaller than a thickness DM of the recording film of an Mth information layer (where M is an integer such that $N > M \geq 1$),
a reflectance RN from the Nth information layer is smaller than two times a reflectance RM from the Mth information layer,
the recording pulse train includes at least one write pulse having a highest power, a bottom pulse which is formed, when there is a plurality of write pulses, between the write pulses, and a cooling pulse which is formed subsequent to a last write pulse, and
when a power of the write pulse is taken as a peak power and a power of the bottom pulse is taken as a bottom power,
the power of each pulse in the recording pulse train is set in the power setting step such that a peak power PwN of the Nth information layer, a bottom power PbN of the Nth information layer, a peak power PwM of the Mth information layer, and a bottom power PbM of the Mth information layer satisfy the following formula:

$$PbN/PwM > PbM/PwM.$$

* * * * *